US011025975B2

(12) United States Patent
Chaar et al.

(10) Patent No.: US 11,025,975 B2
(45) Date of Patent: *Jun. 1, 2021

(54) TARGETING AND DEMOGRAPHICS SCHEDULING UTILIZING A FRAMEWORK FOR AUDIENCE RATING ESTIMATION

(71) Applicant: Turner Broadcasting System, Inc., Atlanta, GA (US)

(72) Inventors: Wassim Samir Chaar, Coppell, TX (US); David James Benoit, Fayetteville, GA (US); José Antonio Carbajal Orozco, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 459 days.

This patent is subject to a terminal disclaimer.

(21) Appl. No.: 14/842,808

(22) Filed: Sep. 1, 2015

(65) Prior Publication Data

US 2017/0064365 A1 Mar. 2, 2017

(51) Int. Cl.
*G06Q 30/02* (2012.01)
*H04N 21/262* (2011.01)
(Continued)

(52) U.S. Cl.
CPC ... *H04N 21/26208* (2013.01); *G06Q 30/0264* (2013.01); *H04N 21/254* (2013.01);
(Continued)

(58) Field of Classification Search
None
See application file for complete search history.

(56) References Cited

U.S. PATENT DOCUMENTS 6,947,450 B2   9/2005   Mangin
8,401,897 B1   3/2013   Chatterjee
(Continued)

FOREIGN PATENT DOCUMENTS

JP   WO2001007985 A3 *   7/1999   ............. G06F 15/00
WO   WO 2001/007985 A3 *   7/1999   ............. G06F 15/00
(Continued)

OTHER PUBLICATIONS

Araman, V., Popescu, I., 2010. Media revenue management with audience uncertainty: Balancing upfront and ,pot market sales. Manufacturing & Service Operations Management 2 (12), 190-212. (Year: 2010).*

(Continued)

*Primary Examiner* — John Van Bramer
(74) *Attorney, Agent, or Firm* — Chip Law Group

(57) ABSTRACT

An advertisement management system receives a commercial break schedule generated from a completed assignment of one or more spots, which correspond to deals including advertiser orders to place the one or more spots into one or more commercial breaks in the commercial break schedule based on constraints and placement requirements. The system determines which of one or more orders in one or more deals are targeting orders, and determine a baseline target delivery for the targeting orders based on expected viewership associated with the targeting orders. The system places a portion of the one or more spots for the targeting orders based on a lift goal over the baseline target delivery, determines a liability per pending spot for spots determined to be candidates for advertisement scheduling and reshuffles placement of a remaining portion of the one or more spots based on the liability per pending spot for the candidates.

27 Claims, 12 Drawing Sheets

(51) Int. Cl.
  *H04N 21/254* (2011.01)
  *H04N 21/2668* (2011.01)
  *H04N 21/258* (2011.01)
  *H04N 21/81* (2011.01)

(52) U.S. Cl.
  CPC ... *H04N 21/25883* (2013.01); *H04N 21/2668* (2013.01); *H04N 21/812* (2013.01)

(56) References Cited

U.S. PATENT DOCUMENTS

| | | | |
|---|---|---|---|
| 8,516,515 B2* | 8/2013 | Zigmond | G06Q 30/02 725/19 |
| 8,544,036 B2 | 9/2013 | Bollapragada et al. | |
| 8,973,023 B1 | 3/2015 | Rao et al. | |
| 9,147,198 B2 | 9/2015 | Emans et al. | |
| 9,668,002 B1 | 5/2017 | Baron et al. | |
| 10,219,048 B2 | 2/2019 | Kunisetty et al. | |
| 2003/0188308 A1 | 10/2003 | Kizuka | |
| 2005/0171897 A1 | 8/2005 | Forsythe et al. | |
| 2006/0259455 A1 | 11/2006 | Anderson et al. | |
| 2007/0033623 A1 | 2/2007 | Fredrickson et al. | |
| 2007/0156525 A1 | 7/2007 | Grouf et al. | |
| 2007/0204310 A1 | 8/2007 | Hua et al. | |
| 2007/0239536 A1 | 10/2007 | Bollapragada | |
| 2007/0288979 A1 | 12/2007 | Yen | |
| 2008/0189178 A1 | 8/2008 | Schepers et al. | |
| 2008/0189734 A1 | 8/2008 | Schepers et al. | |
| 2008/0201188 A1 | 8/2008 | Heyman et al. | |
| 2008/0250447 A1 | 10/2008 | Rowe et al. | |
| 2008/0263578 A1 | 10/2008 | Bayer et al. | |
| 2008/0263583 A1 | 10/2008 | Heath | |
| 2009/0006145 A1 | 1/2009 | Duggal et al. | |
| 2009/0070211 A1 | 3/2009 | Gonen | |
| 2009/0106082 A1 | 4/2009 | Senti et al. | |
| 2009/0144168 A1* | 6/2009 | Grouf | G06F 16/438 705/26.1 |
| 2009/0150224 A1 | 6/2009 | Lu et al. | |
| 2009/0254932 A1 | 10/2009 | Wang et al. | |
| 2009/0276317 A1 | 11/2009 | Dixon et al. | |
| 2010/0023408 A1 | 1/2010 | Neill | |
| 2010/0042496 A1 | 2/2010 | Wang et al. | |
| 2010/0088719 A1 | 4/2010 | Hawkins et al. | |
| 2010/0146542 A1 | 6/2010 | Weihs et al. | |
| 2011/0078740 A1 | 3/2011 | Bolyukh et al. | |
| 2011/0093343 A1 | 4/2011 | Hatami-Hanza | |
| 2011/0119136 A1 | 5/2011 | Eldreth et al. | |
| 2011/0161162 A1 | 6/2011 | Ketchum | |
| 2011/0288907 A1 | 11/2011 | Harvey et al. | |
| 2012/0042338 A1 | 2/2012 | Kitts et al. | |
| 2012/0167125 A1 | 6/2012 | Grubb | |
| 2012/0191541 A1 | 7/2012 | Yang et al. | |
| 2013/0097629 A1 | 4/2013 | Popescu et al. | |
| 2013/0166395 A1 | 6/2013 | Vassilvitskii et al. | |
| 2013/0205339 A1 | 8/2013 | Haberman et al. | |
| 2013/0219427 A1 | 8/2013 | Zundel et al. | |
| 2013/0254787 A1 | 9/2013 | Cox et al. | |
| 2014/0006118 A1 | 1/2014 | Charania | |
| 2014/0046661 A1 | 2/2014 | Bruner | |
| 2014/0074591 A1 | 3/2014 | Allen et al. | |
| 2014/0082660 A1 | 3/2014 | Zhang et al. | |
| 2014/0109123 A1 | 4/2014 | Balakrishnan et al. | |
| 2014/0143032 A1 | 5/2014 | Tomlin et al. | |
| 2015/0089540 A1* | 3/2015 | Kitts | H04N 21/25891 725/35 |
| 2015/0186403 A1 | 7/2015 | Srivastava et al. | |
| 2015/0269632 A1 | 9/2015 | Ledwich et al. | |
| 2015/0319510 A1 | 11/2015 | Dellahy et al. | |
| 2015/0348091 A1 | 12/2015 | Haberman et al. | |
| 2015/0365735 A1 | 12/2015 | Kunisetty et al. | |
| 2015/0373387 A1 | 12/2015 | Chaar et al. | |
| 2016/0117718 A1 | 4/2016 | Hood et al. | |
| 2016/0246765 A1 | 8/2016 | Hundemer | |
| 2016/0357362 A1 | 12/2016 | Gauci et al. | |

FOREIGN PATENT DOCUMENTS

| | | |
|---|---|---|
| WO | 0051335 A2 | 8/2000 |
| WO | 2000051335 A3 | 1/2001 |

OTHER PUBLICATIONS

Araman, V., Popescu, I., 2010. Media revenue management with audience uncertainty: Balancing upfront and ,pot market sales. Manufacturing & Service Operations Management 2 (12), 190-212.

Bertsimas, D., Tsitsiklis, J., 1997. Introduction to Linear Optimization. Athena Scientific, Belmont, Massachusetts.

Bollapragada, S., Bussieck, M., Mallik, S., 2004. Scheduling commercial videotapes in broadcast television. Operations Research 52 (5), 679-689.

Bollapragada, S., Cheng, H., Phillips, M., Scholes, M., Gibbs, T., Humphreville, M., 2002. Nbc's optimization systems Increase its revenues and productivity. Interfaces 32 (1), 47-60.

Bollapragada, S., Garbiras, M., 2004. Scheduling commercials on broadcast television. Operations Research 52 (3), 337-345.

Danaher, P., Dagger, T., 2012. Using a nested legit model to forecast television ratings. International Journal of Forecasting 28 (3), 607-622.

Danaher, P., Dagger, T., Smith, M., 2011. Forecasting television ratings. International Journal of Forecasting 27 (4), 1215-1240.

Horen, J., 1980. Scheduling of network television programs. Management Science 26 (4), 354-370.

International Search Report and the Written Opinion of the International Searching Authority, or the Declaration, in International application No. PCT/US12/59857, dated Jan. 4, 2013. (11 pages).

Reddy, S., Aronson, J., Stam, A., 1998. Spot: Scheduling programs optimaly for television. Management Science 44 (1), 83-102.

Corrected Notice of Allowance in U.S. Appl. No. 14/930,586 dated Aug. 1, 2018.

Corrected Notice of Allowance in U.S. Appl. No. 14/930,586 dated Jul. 3, 2018.

Non-Final Office Action in U.S. Appl. No. 14/930,599 dated Aug. 28, 2018.

Non-Final Office Action in U.S. Appl. No. 15/865,716 dated Jul. 23, 2018.

Notice of Allowance in U.S. Appl. No. 14/842,799 dated Jun. 15, 2018.

Advisory Action for U.S. Appl. No. 14/930,559 dated May 6, 2019.

Final Office Action in U.S. Appl. No. 14/930,559 dated Feb. 25, 2019.

Final Office Action in U.S. Appl. No. 15/091,475 dated Mar. 28, 2019.

Final Office Action in U.S. Appl. No. 15/865,716 dated Mar. 5, 2019.

Non-Final Office Action in U.S. Appl. No. 16/026,422 dated Jan. 22, 2019.

Notice of Allowance in U.S. Appl. No. 16/026,422 dated Mar. 15, 2019.

Advisory Action for U.S. Appl. No. 15/865,716 dated Jun. 21, 2019.

Advisory Action in U.S. Appl. No. 15/091,475 dated Jun. 12, 2019.

Corrected Notice of Allowance for U.S. Appl. No. 16/026,422 dated May 14, 2019.

Corrected Notice of Allowance for U.S. Appl. No. 16/026,422 dated Aug. 22, 2019.

Corrected Notice of Allowance in U.S. Appl. No. 16/026,422 dated Jun. 10, 2019.

Final Office Action for U.S. Appl. No. 15/621,147 dated Jul. 29, 2019.

Final Office Action for U.S. Appl. No. 15/621,151 dated Jul. 16, 2019.

Non-Final Office Action for U.S. Appl. No. 14/930,559 dated Aug. 22, 2019.

Notice of Allowance for U.S. Appl. No. 16/026,422 dated May 28, 2019.

Advisory Action for U.S. Appl. No. 15/621,151 dated Oct. 3, 2019.

Advisory Action for U.S. Appl. No. 15/621,147 dated Oct. 21, 2019.

(56) References Cited

OTHER PUBLICATIONS

Corrected Notice of Allowance for U.S. Appl. No. 16/026,422 dated Oct. 30, 2019.
Non-Final Office Action for U.S. Appl. No. 15/091,475 dated Oct. 3, 2019.
Final Office Action for U.S. Appl. No. 15/091,475 dated Apr. 16, 2020.
Final Office Action for U.S. Appl. No. 14/930,559 dated Feb. 7, 2020.
Non-Final Office Action for U.S. Appl. No. 15/621,147 dated Mar. 6, 2020.
Non-Final Office Action for U.S. Appl. No. 15/621,151 dated Feb. 6, 2020.
Notice of Allowance for U.S. Appl. No. 15/865,716 dated Apr. 6, 2020.
Corrected Notice of Allowance for U.S. Appl. No. 15/865,716 dated Aug. 28, 2020.
Final Office Action for U.S. Appl. No. 15/621,147 dated Sep. 4, 2020.
Final Office Action for U.S. Appl. No. 15/621,151 dated Aug. 7, 2020.
Non-Final Office Action for U.S. Appl. No. 14/930,559 dated Aug. 21, 2020.
Non-Final Office Action for U.S. Appl. No. 15/091,475 dated Aug. 21, 2020.
Non-Final Office Action in U.S. Appl. No. 15/621,147 dated Jan. 15, 2019.
Non-Final Office Action in U.S. Appl. No. 15/621,151 dated Jan. 15, 2019.
Notice of Allowance in U.S. Appl. No. 14/842,799 dated Apr. 17, 2018.
Notice of Allowance in U.S. Appl. No. 14/842,799 dated May 10, 2018.
Notice of Allowance in U.S. Appl. No. 14/930,586 dated May 18, 2018.
Notice of Allowance in U.S. Appl. No. 14/930,586 dated May 2, 2018.
Notice of Allowance in U.S. Appl. No. 14/930,586 dated May 24, 2018.
Non-Final Office Action in U.S. Appl. No. 15/091,475 dated Sep. 28, 2018.
Araman et al., "Media Revenue Management with Audience Uncertainty: Balancing Upfront and Spot Market Sales," Manufacturing & Service Operations Management, vol. 12, No. 2, pp. 190-212, 2010.
Supplemental Notice of Allowance for U.S. Appl. No. 14/930,559 dated Mar. 17, 2021.
Final Office Action for U.S. Appl. No. 15/091,475 dated Feb. 18, 2021.
Notice of Allowance for U.S. Appl. No. 14/930,559 dated Feb. 16, 2021.

\* cited by examiner

TARGETING AND DEMOGRAPHICS SCHEDULING UTILIZING A FRAMEWORK FOR AUDIENCE RATING ESTIMATION

CROSS-REFERENCE TO RELATED APPLICATIONS/INCORPORATION BY REFERENCE

U.S. application Ser. No. 14/842,799, which is filed concurrently herewith; and
U.S. application Ser. No. 14/842,817, which is filed concurrently herewith.

Each of the above referenced patent application and patent is hereby incorporated herein by reference in its entirety.

FIELD OF TECHNOLOGY

Certain embodiments of the disclosure relate to targeting of advertisements. More specifically, certain embodiments of the disclosure relate to a method and system for targeting and demographics scheduling utilizing a framework for audience rating estimation.

BACKGROUND

The process of scheduling linear media advertisement spots into commercial breaks tends to be tedious, and prone to errors. While some systems are available to receive an advertiser's order for the placement of spots into commercial breaks, these products either simply try to fill empty holes that exist within already scheduled commercial breaks on a first come, first placed basis, or do not address all requirements associated with the commercials. As a result, the systems currently available typically fail to honor all the constraints and requirements for each of the spots.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for targeting and demographics scheduling utilizing a framework for audience rating estimation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
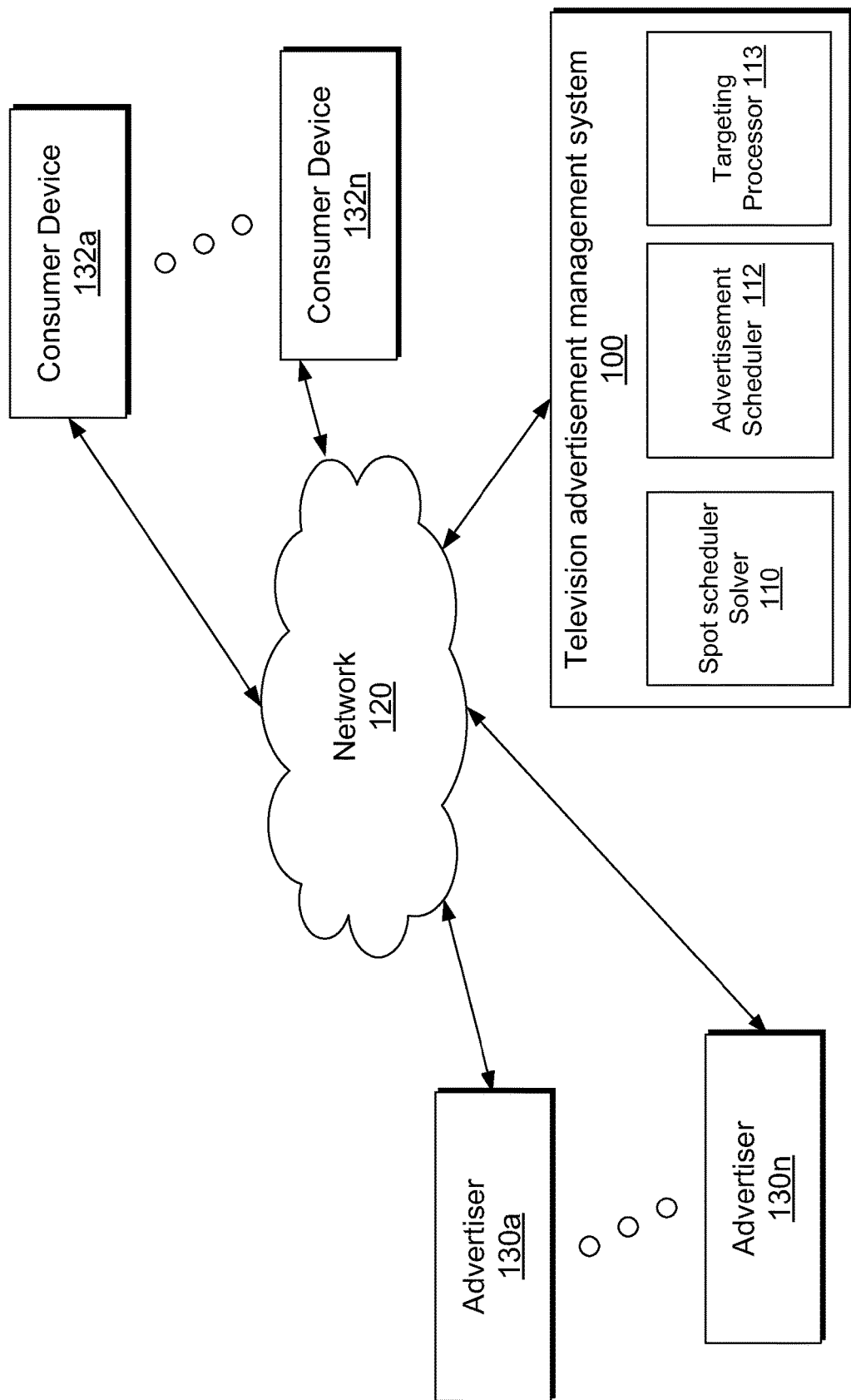
FIG. 1A is a block diagram that illustrates an exemplary system for receiving and processing spot scheduling orders, in accordance with an exemplary embodiment of the disclosure.

Certain embodiments of the disclosure may be found in a method and system for targeting and demographics scheduling utilizing a framework for audience rating estimation. The framework for audience rating estimation may also be referred to as a framework or model for audience estimation or model for audience rating estimation. Traditionally, advertisement in television media has been measured by the number of people within a specific demographic (age range plus gender). Nowadays, advertisers want to create more focused advertising campaigns that target better the customers that will be exposed to them. Various embodiments of the disclosure may comprise an advertisement management system that communicates with a plurality of advertiser order generation systems and electronically receives, via a communication network, deals comprising orders from advertisers. The advertisement management system may receive a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement management system may determine which of one or more orders in one or more deals are targeting orders, and determine a baseline target delivery for the targeting orders based on expected viewership associated with the targeting orders. The advertisement management system may place a portion of the one or more spots for the targeting orders based on a lift goal over the baseline target delivery, and determine a liability per pending spot for one or more spots that are determined to be candidates for advertisement scheduling. The advertisement management system may reshuffle placement of a remaining portion of the one or more spots based on the liability per pending spot for the one or more spots that are determined to be candidates for advertisement scheduling so as to minimize liability associated with the one or more deals, wherein the reshuffling is based on a forecast of expected viewership associated with the one or more spots that are determined to be candidates for advertisement scheduling. The advertisement management system may generate a finalized commercial break schedule based on the reshuffling. The advertisement management system may concurrently place the portion of the one or more spots for the targeting orders based on a lift goal over the baseline target delivery, and reshuffle placement of a remaining portion of the one or more spots based on the liability per pending spot for the one or more spots that are determined to be candidates for advertisement scheduling.

The advertisement management system may determine a percentage lift for providing the determined baseline target delivery. In an embodiment of the disclosure, the baseline target delivery is a mean target delivery per selling title, and the mean target delivery per selling title is determined from a sum of all deliveries in a 30-minute period within the selling title divided by the number of 30-minute periods. In another embodiment of the disclosure, the baseline target delivery may be a median target delivery per selling title. The percentage lift may be adjustable based on accrued actual target delivery. The lift goal may be adjusted if the accrued actual target delivery is less than forecasted.

The advertisement management system may determine each target for each of the one or more targeting deals, and for each target, generate an estimate of the expected viewership associated with the one or more targeting deals. If advertisement scheduler needs to run, the advertisement management system may determine each demographic for each of the one or more orders in the one or more deals, and generate, for each demographic, an estimate of the expected viewership associated with each of the one or more orders in the one or more deals. The advertisement management system may modify the forecast of expected viewership associated with each of the one or more orders in the one or more deals regardless of whether or not the orders are targeting orders based on a weighting factor.

In accordance with various embodiments of the disclosure, consumer choice modeling may be utilized to model the decision process of individuals or segments of a population in the media context. In this regard, consumer choice modeling may be utilized to predict viewership, impressions or market share as a function of various media attributes. In this regard, consumer choice modeling may be utilized to determine the media attributes that are driving consumer decisions to select media content for consumption. The media attributes are a function of time and program and includes time attributes and program attributes, respectively. The time attributes and program attributes may be weighted. The consumer choice model may be utilized to determine how much weight (beta) should be applied to each of the time attributes and program attributes. The weight (beta) may be determined on a per demographics (demo) basis per network or on a per target basis per network.

In accordance with various embodiments of the disclosure, consumer choice modeling examines years worth of historic data on a network by network basis to account for various factors such as special events, and seasonality, for example, July 4 (Independence Day), Christmas Eve, Easter, the particular quarter (Qtr), particular season (spring, summer, autumn, winter), and so on. For example, viewership for children networks such as Cartoon Network, may be higher during summer, holidays, or other times when children may have more availability, and this seasonality is taken into account by the consumer choice modeling.

FIG. 1A is a block diagram that illustrates an exemplary system for receiving and processing spot scheduling orders, in accordance with an exemplary embodiment of the disclosure. Referring to FIG. 1A, there is shown a television advertisement scheduling system 100 that is communicatively coupled to advertiser order generation systems 130a, . . . , 130n through a network 120. Consumer devices 132a, . . . , 132n are communicatively coupled to the network 120. The television advertisement scheduling system 100 may comprise a spot scheduler solver 110, an advertisement scheduler 112, and a targeting processor 113.

The network 120 may be any kind of network, or a combination of various networks, and it is shown illustrating the communication that may occur between the advertiser order generation systems 130a, . . . , 130n and the television advertisement scheduling system 100. For example, the network 120 may comprise one or more of a cable television network, the Internet, a satellite communication network, a wide area network (WAN), a medium area network (MAN), and a local area network (LAN).

The television advertisement scheduling system 100 may be operated by a broadcasting company and may comprise a spot scheduler solver 110. The broadcast company may be operable to multicast content via a plurality of channels, for example, traditional over-the-air broadcast channels, cable television networks, satellite communication networks, the Internet, and/or other content delivery networks. The spot scheduler solver 110 may comprise suitable logic, circuitry, code, and/or interfaces that may be operable to receive orders from one or more of the advertiser order generation systems 130a, . . . , 130n to place advertisements spots into one or more commercial breaks that occur during television programming broadcast. That is, the spot scheduler solver 110 may be utilized to determine the appropriate scheduling of advertisement spots to produce a commercial break schedule according to the information provided by the advertiser order generation systems 130a, . . . , 130n. The advertiser order generation systems 130a, . . . , 130n may place orders with the broadcasting company that include information about the type of spots to be broadcast, the number of spots to be broadcast, and when should the spots be aired. In this regard, the advertiser order generation systems 130a, . . . , 130n may electronically book spots to a selling title (ST), and within the selling title there are constraints. The advertiser order generation systems 130a, . . . , 130n may provide multiple orders, which need not be submitted at the same time. Therefore, the spot scheduler solver 110 may continuously receive orders with new or additional spots to be placed and may need to update any previously determined commercial break schedule to accommodate the constraints and requirements of those spots already placed and of the new spots being received.

The television advertisement scheduling system 100 may have a cutoff after which orders submitted by the advertiser order generation systems 130a, . . . , 130n may not be considered by the spot scheduler solver 110 when preparing a next commercial break schedule. A commercial break schedule may include a final or complete schedule of the spots that are to appear during a specified period of television programming such as hours, days, weeks, or a combination thereof.

Various embodiments of the disclosure, the television advertisement scheduling system 100, may comprise a spot scheduler solver 110 and an advertisement scheduler 112. Although the spot scheduler solver 110 and the advertisement scheduler 112 are illustrated as separate entities, they may be integrated as a single entity in which the advertisement scheduler 112 may be enabled or disabled utilizing, for example, one or more parameters. The television advertisement scheduling system 100 may be operable to electronically receive, via the communication network 120, deals comprising advertisers orders from the plurality of advertiser order generation systems 130*a*, . . . , 130*n*. The spot scheduler solver 110 may be operable to receive an advertiser's order to place one or more spots into one or more commercial breaks. The advertiser's order comprises airing constraints and placement requirements corresponding to the one or more spots, and each of the one or more commercial breaks comprises a plurality of inventory buckets. The airing constraints corresponding to each of the one or more spots comprise one or more of network constraints, selling title constraints, inventory type constraints, allowable date and time constraints, and advertiser conflict constraints. The placement requirements corresponding to each of the one or more spots comprise one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

A position of each of the plurality of inventory buckets within each of the one or more commercial breaks may define a sequencing order of each of the inventory buckets within each of the one or more commercial breaks, and each of the plurality of inventory buckets comprise a corresponding inventory type that indicates a type of content in each of the plurality of inventory buckets. The spot scheduler solver 110 may be operable to assign each of the one or more spots to at least one of the plurality of inventory buckets that are within each of the one or more commercial breaks based on the airing constraints and placement requirements. The spot scheduler solver 110 may be operable to match the characteristics of the assigned at least one of the plurality of inventory buckets that are within each of the one or more commercial breaks with the airing constraints and requirements of each of the one or more spots. The spot scheduler solver 110 may be operable to rank the one or more spots that are within each of the assigned at least one of the plurality of inventory buckets that are within each of the one or more commercial breaks based on the matching such that the airing constraints and placement requirements corresponding to the one or more spots are fulfilled. The spot scheduler solver 110 may be operable to reshuffle the one or more spots that are within each of the assigned at least one of the plurality of inventory buckets that are within each of the one or more commercial breaks. When at least one of the one or more spots are not assigned to the at least one of the plurality of inventory buckets that are within each of the one or more commercial breaks because of conflicts, the spot scheduler solver 110 may be operable to perform a prioritization scheme to complete the assignment of the one or more spots that are not assigned. The spot scheduler solver 110 may be operable to prioritize the spots based on arrival lead time such that all spots for a particular order are given the same priority, and priorities are chosen such that a sum of all priorities post a certain arrival time is less than a priority on any spot prior to the certain arrival time. The spot scheduler solver 110 may also be operable to maximize the sum of the rates corresponding to the one or more spots. The spot scheduler solver 110 may also be operable to maximize the spread of days in which the one or more spots occur over the duration of the commercial break schedule. The spot scheduler solver 110 may be operable to generate a commercial break schedule based on the completed assignment of the one or more spots that are not assigned. It should readily be understood by one of skill in the art that other metrics may be utilized without departing from the spirit and scope of the various embodiments of the disclosure.

The spot scheduler solver 110 may also be operable to receive an additional advertiser's order to place one or more additional spots into the one or more commercial breaks, wherein the additional advertiser's order comprises constraints and placement requirements corresponding to the one or more additional spots. The spot scheduler solver 110 may also be operable to assign each of the one or more spots and the one or more additional spots to at least one of the plurality of inventory buckets within the one or more commercial breaks based on the corresponding constraints and placement requirements. When at least one of the one or more spots and the one or more additional spots is not assigned because of conflicts, the spot scheduler solver 110 may also be operable to a perform a prioritization scheme to complete the assignment of the at least one spot that is not assigned. The spot scheduler solver 110 may also be operable to modify the generated commercial break schedule based on the completed assignment of the at least one spot that is not assigned. The spot scheduler solver 110 may be operable to communicate the generated commercial break schedule to the advertisement scheduler 112 for processing.

The advertisement scheduler 112 may be operable to receive the generated commercial break schedule, and determine a current indexing representative of the liability per pending spot for one or more of the deals. The advertisement scheduler 112 may be operable to reshuffle and prioritize the placement of the one or more spots based on one or more metrics such as a current indexing of the one or more deals in order to minimize liability associated with the one or more deals. The current indexing represents the projected liability of a pending spot and is determined based on what has already been aired, and what will be aired in the future. The reshuffling may be based on a forecast of expected viewership associated with the one or more deals. The advertisement scheduler 112 may be operable to generate a finalized commercial break schedule based on the reshuffling and apply the finalized schedule to the log. It should readily be understood by one of skill in the art that the other metrics other than the current indexing, which represents the projected liability per pending spot, may be utilized without departing from the spirit and scope of the various embodiments of the disclosure.

In accordance with various embodiments of the disclosure, an advertisement management system 100, which comprises a spot scheduler solver 110 and an advertisement scheduler 112, is operable to communicate with a plurality of advertiser order generation systems 130*a*, . . . , 130*n*, and electronically receives, via a communication network 120, deals comprising advertiser orders. The advertisement scheduler 112 receives a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler 112 may determine a current indexing for one or more of the deals, and reshuffles the placement of the one or more spots based on the current indexing of the one or more deals in order to minimize liability associated with the one or more deals. The reshuffling is based on a forecast of expected viewership associated with the one or more deals. The reshuffling of the placement of the one or more spots is done across one or more channels that airs the one or more spots. The advertisement scheduler 112 may generate a finalized commercial break schedule based on the reshuffling. The expected viewership may be forecasted for a particular period based in the status of prior logs. As an example, and without limitation, the expected viewership may be forecasted based on the status of the prior logs for an upcoming 7-day period.

The advertisement scheduler 112 may update a current forecast of expected viewership at the end of the particular period based on actual ratings for a prior week, which may be derived at last in part from Nielsen ratings and/or other data sources. The advertisement scheduler 112 may maximize delivery for candidate spots that are under-delivering (that is, underperforming deals or deals that are not pacing as expected, where pacing is a computation of cumulative demographics guaranteed so far, that is, at a particular point in time), and reshuffle the placement of the one or more spots such that the candidate spots get maximum delivery in order to minimize the liability. For example, the advertisement scheduler 112 may determine or identify candidate spots with liability above a certain value such as a threshold value, which indicates that the spots are not pacing as expected or under-delivering, and may reshuffle the placement of the one or more spots such that the candidate spots achieve maximum delivery, thereby minimizing liability. The candidate spots may be determined or identified based on their current delivery value. The advertisement scheduler 112 may determine each demographic for each of the one or more spots and generate, for each demographic, an estimate of the expected viewership associated with the one or more spots.

The advertisement scheduler 112 may generate the estimate of the expected viewership for specified time intervals. The time intervals may be, for example, 30-minute time intervals. The advertisement scheduler 112 may determine a current indexing for each of a plurality of the deals, and provide preferential treatment to placement of the one or more spots for one or more of the plurality of deals having greatest liability based on the determined current indexing when performing the reshuffling. The advertisement scheduler 112 may modify the forecast of expected viewership associated with the one or more deals based on a weighting factor, which may be updatable. The advertisement scheduler 112 may update the weighting factor over time to improve the current indexing of the one or more deals over time.

The targeting processor 113 may comprise suitable logic, circuitry, and interfaces that may be operable to execute code that may be operable to handle the processing of one or more orders in one or more deals that are targeting orders. The targeting processor 113 may be operable to acquire and/or determine audience rating estimates for targeted spots, and may handle the placement of the targeted spots based on the audience rating estimates. The targeting processor 113 may also be operable to determine a lift goal, determine whether the lift goal may be achieved, and modify the lift goal in instances where the lift goal cannot be achieved.

In accordance with an aspect of the disclosure, the advertisement scheduler 112 may operate independently of the targeting processor 113. In another aspect of the disclosure, the advertisement scheduler 112 and the targeting processor 113 may operate concurrently. In this regard, the advertisement scheduler 112 may concurrently place the portion of the one or more spots for the targeting orders based on a lift goal over the baseline target delivery, while the targeting processor 113 may reshuffle placement of a remaining portion of the one or more spots based on the liability per pending spot for the one or more spots that are determined to be candidates for advertisement scheduling. The advertisement scheduler 112, and the target processor 113 may operate independently of each other. In this regard, in some instances, only the target processor 113 may operate, while in other instances, only the advertisement scheduler 112 may operate. Furthermore, in some instances, the target processor 113 and the advertisement scheduler 112 may operate concurrently.

Figure 1B:
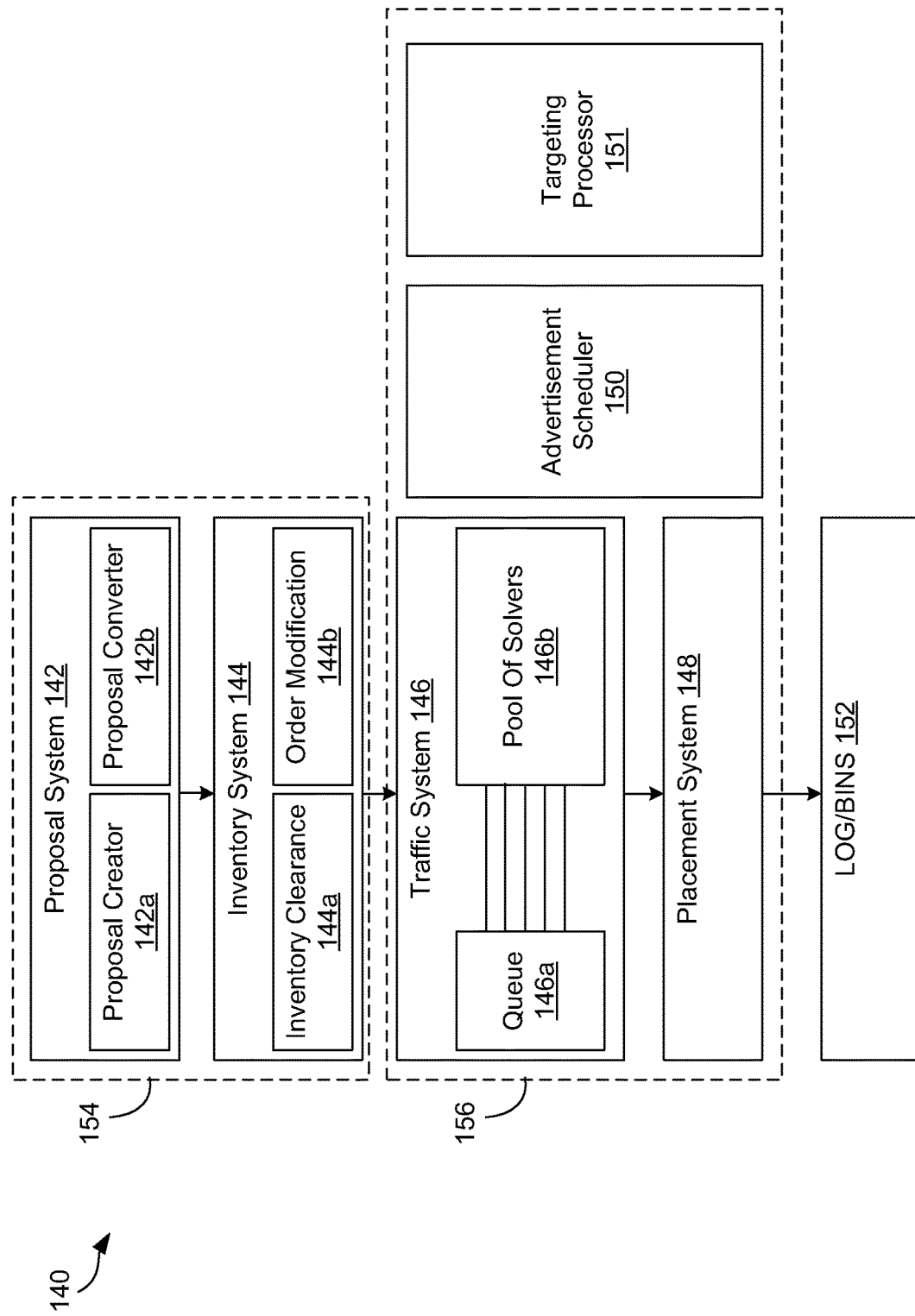
FIG. 1B is a diagram of the television advertisement management system, in accordance with an exemplary embodiment of the disclosure.

FIG. 1B is a diagram of the television advertisement management system, in accordance with an exemplary embodiment of the disclosure. Referring to FIG. 1B, there is shown a television advertisement management system 140, which may be similar to the television advertisement management system 100 of FIG. 1A. The television advertisement management system 140 comprises proposal system 142, inventory system 144, traffic system 146, placement system 148, and advertisement system 150. The proposal system 142, and the inventory system 144 may be referred to as an order booking system 154. The traffic system 146, the advertisement schedule 150, and the targeting processor 151 may be referred to as a spot scheduler 156.

The proposal system 142 comprises hardware systems that are operable to create and negotiate proposals with the advertiser order generation systems 130a, . . . , 130n, which are illustrated in FIG. 1A, to produce one or more deals. A negotiated deal may have one or more orders. Each order is specific to a single network for a single brand. The same order may not span multiple networks. The proposal system 142 comprises proposal creator 142a, and proposal converter 142b. The proposal creator 142a is operable to create and negotiate the proposals. The proposal converter 142b is operable to accept and convert the negotiated proposals to one or more orders.

The inventory system 144 comprises inventory clearance system 144a, and border modification system 144b. The inventory clearance system 144a is operable to clear the orders based on available inventory. The orders may be cleared, for example, on a first come first serve (FCFS) basis. When an order is received, the order may specify the x units be placed in selling title week A, y units be placed in selling title week B, and z units be placed in selling title week C, for example. Since there may be multiple bookings occurring, the inventory clearance system 144a ensures the availability of the inventory for booking the required units for the order. The order modification system 144b may be operable to change the attributes associated with an order that has already cleared inventory, add one or more units for an order to the inventory, or delete one or more units from inventory.

The traffic system 146 may comprise suitable hardware that may be operable to receive cleared and/or modified orders and queue them for assignment to an available spot scheduler solver. In this regard, the traffic system 146a may comprise a hardware queue 146a, and a plurality of spot scheduler solvers 146b. The queue 146a may be operable to queue cleared and/or modified orders by the traffic system 146. The traffic system 146 may assign the cleared and/or modified orders that are queued in the queue 146a to an available spots scheduler solver in the pool of spot scheduler solvers 146b for spot scheduling. The placement system 148 is operable to place the spots on the logs/bins 152 based on the results from the spot scheduler solvers.

The advertisement scheduler 150 may be operable to receive the generated commercial break schedule, determine a current indexing representative of the liability per pending spot for one or more of the deals, reshuffle and prioritize the placement of the one or more spots based on one or more metrics such as a current indexing of the one or more deals in order to minimize liability associated with the one or more deals. The reshuffling may be based on a forecast of expected viewership associated with the one or more deals. The advertisement scheduler 150 generates a finalized commercial break schedule based on the reshuffling and applies the finalized schedule to the log.

The targeting processor 151 may handle the processing of targeting orders. In this regard, the targeting processor 113 may be operable to acquire and/or determine CAE estimates for targeted spots, and may handle the placement of the targeted spots based on the audience rating estimates. The targeting processor 113 may also be operable to determine a lift goal, determine whether the lift goal is achievable, and modify the lift goal in instances where the lift goal is not achievable. Although the advertisement scheduler 150 may operate without the target processor 151 operating, in some instances, that advertisement scheduler 150 and the targeting processor 151 may operate concurrently. In this regard, the advertisement scheduler 112 concurrently places a portion of the one or more spots for the targeting orders based on a lift goal over the baseline target delivery, while the targeting processor 113 reshuffles placement of a remaining portion of the one or more spots based on the liability per pending spot for the one or more spots that are determined to be candidates for advertisement scheduling.

Orders requiring advertisement scheduling may be processed by the advertisement scheduler 150 and placed on the logs/bins based on the results from the advertisement scheduler 150.

Figure 1C:
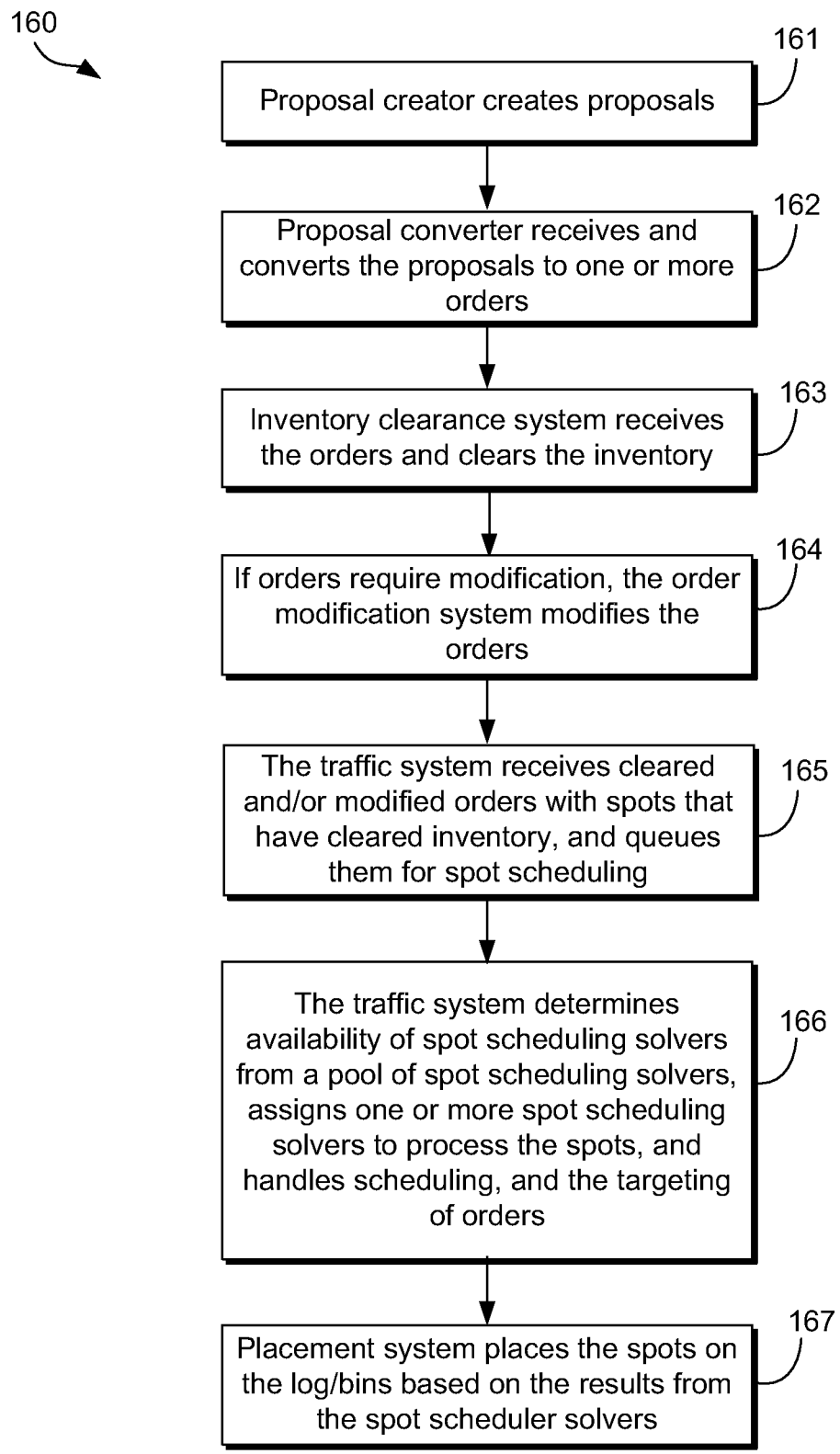
FIG. 1C is a flow chart illustrating high-level operation of the television advertisement management system of FIG. 1B, in accordance with an exemplary embodiment of the disclosure.

FIG. 1C is a flow chart illustrating high-level operation of the television advertisement management system of FIG. 1B, in accordance with an exemplary embodiment of the disclosure. Referring to FIG. 1C, there are shown exemplary steps 161 through 167. In step 161, the proposal creator 142a creates proposals. In step 162, the proposal converter 142b receives and converts the proposals to one or more orders. In step 163, the inventory clearance system 144a receives the orders and clears the inventory. In step 164, if orders require modification, the order modification system 144b modifies the orders. In step 165, the traffic system 146 receives cleared and/or modified orders with spots that have cleared inventory and queues them in the queue 146a for spot scheduling. In step 166, the traffic system 146 determines availability of spot scheduling solvers from a pool of spot scheduling solvers 146b, assigns one or more spot scheduling solvers to process the spots, and handles the scheduling and the targeting of orders. In step 167, the placement system 148 places the spots on the log/bins 152 based on the results from the spot scheduler solvers.

Figure 2A:
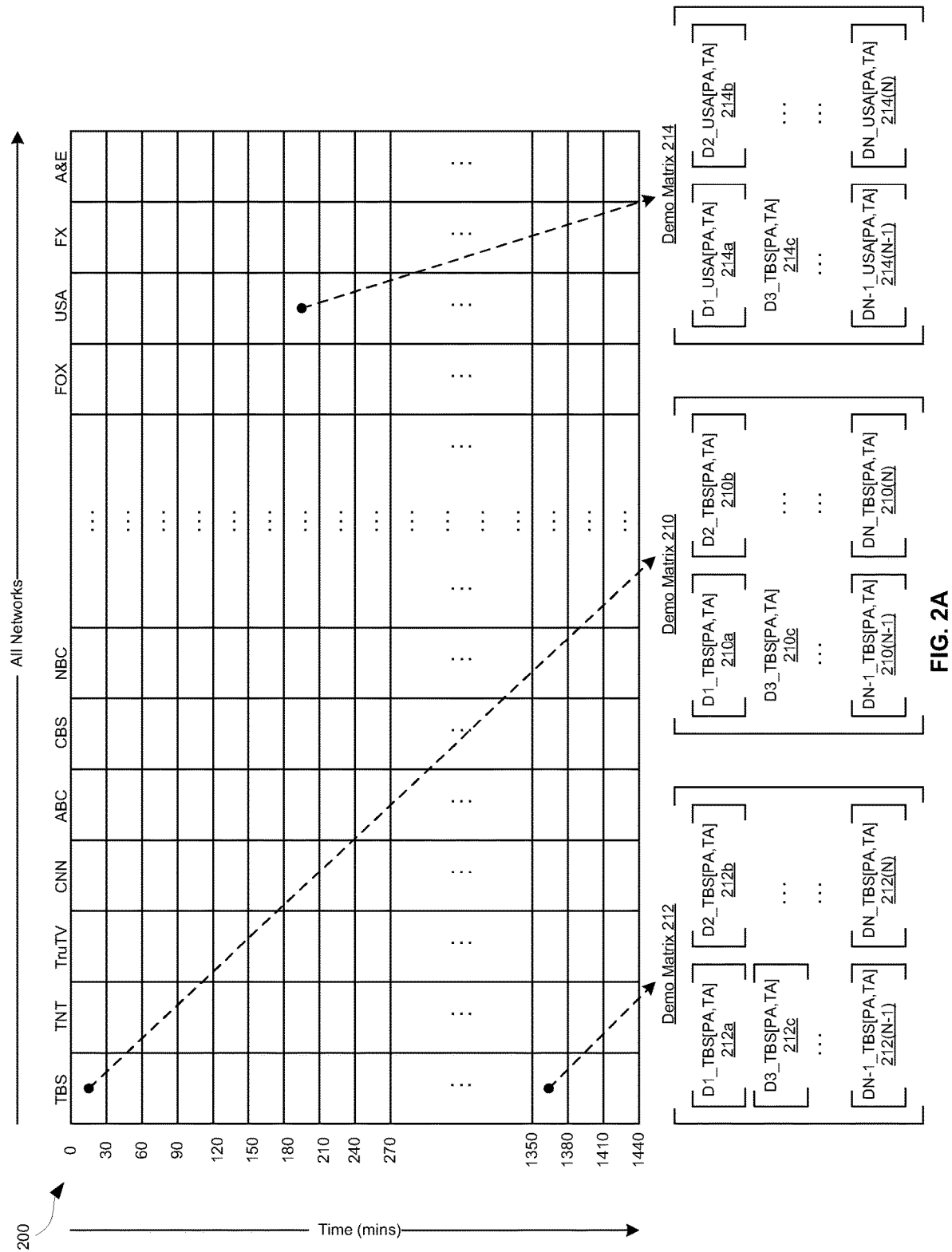
FIG. 2A is a diagram that illustrates a framework audience rating estimation for a media system, in accordance with various exemplary embodiments of the disclosure.

FIG. 2A is a diagram that illustrates a framework for audience rating estimation for a media system, in accordance with various exemplary embodiments of the disclosure. Referring to FIG. 2A, there is shown an exemplary base matrix 200 comprising a plurality of columns and a plurality of rows. Each of the plurality of columns represents a particular network among all networks, and each of the rows represents the 48 30-minute periods/segments in a day (24-hour period). As illustrated, there are shown exemplary networks, TBS, TNT, TruTV, CNN, ABC, CBS, NBC, . . . , FOX, USA, FX, and A&E.

Each element in the base matrix 200 may be represented by a demo matrix, which comprises a plurality of demo matrix elements, representing all demographics. For example, demo matrix 210 represents all the demographics for TBS network, for the 0-30 ($1^{st}$) 30-minute period. The demo matrix 210 comprises demo matrix elements 210a, 210b, 210c, . . . , 210(N-1), 210N, where N is an integer greater than 1. Demo matrix element 210a comprises a first demo D1 for TBS, which includes all program attributes (PA), and time attributes (TA), and is collectively represented as D1_TBS[PA,TA]. Demo matrix element 210b comprises a second demo D2 for TBS, which includes all program attributes (PA), and time attributes (TA), and is collectively represented as D2_TBS[PA,TA]. Demo matrix element 210c comprises a third demo D3 for TBS, which includes all program attributes (PA), and time attributes (TA), and is collectively represented as D3_TBS[PA, TA] . . . . Demo matrix element 210(N-1) comprises a (N-1)$^{th}$ demo D(N-1) for TBS, which includes all program attributes (PA), and time attributes (TA), and is collectively represented as DN-1_TBS[PA,TA]. Demo matrix element 210(N) comprises a N$^{th}$ demo D(N) for TBS, which includes all program attributes (PA), and time attributes (TA), and is collectively represented as DN-1_TBS[PA,TA].

The demo matrix 212 represents all the demographics for TBS network, for the 1350-1380 (46$^{th}$) 30-minute period. The demo matrix 212 comprises demo matrix elements 212a, 212b, 212c, . . . , 212(N-1), 212N, where N is an integer greater than 1. Demo matrix element 212a comprises a first demo D1 for TBS, which includes all program attributes (PA), and time attributes (TA), and is collectively represented as D1_TBS[PA,TA]. Demo matrix element 212b comprises a second demo D2 for TBS, which includes all program attributes (PA), and time attributes (TA), and is collectively represented as D2_TBS[PA,TA]. Demo matrix element 212c comprises a third demo D3 for TBS, which includes all program attributes (PA), and time attributes (TA), and is collectively represented as D3_TBS[PA, TA] . . . . Demo matrix element 212(N-1) comprises a (N-1)$^{th}$ demo D(N-1) for TBS, which includes all program attributes (PA), and time attributes (TA), and is collectively represented as DN-1_TBS[PA,TA]. Demo matrix element 212(N) comprises a N$^{th}$ demo D(N) for TBS, which includes all program attributes (PA), and time attributes (TA), and is collectively represented as DN-1_TBS[PA,TA].

The demo matrix 214 represents all the demographics for USA network, for the 180-210 (7$^{th}$) 30-minute period. The demo matrix 214 comprises demo matrix elements 214a, 214b, 214c, . . . , 214(N-1), 214N, where N is an integer greater than 1. Demo matrix element 214a comprises a first demo D1 for USA, which includes all program attributes (PA), and time attributes (TA), and is collectively represented as D1_USA[PA,TA]. Demo matrix element 214b comprises a second demo D2 for USA, which includes all program attributes (PA), and time attributes (TA), and is collectively represented as D2_USA[PA,TA]. Demo matrix element 214c comprises a third demo D3 for USA, which includes all program attributes (PA), and time attributes (TA), and is collectively represented as D3_USA[PA, TA] . . . . Demo matrix element 214(N-1) comprises a (N-1)$^{th}$ demo D(N-1) for USA, which includes all program attributes (PA), and time attributes (TA), and is collectively represented as DN-1_USA[PA,TA]. Demo matrix element 214(N) comprises a $N^{th}$ demo D(N) for USA, which includes all program attributes (PA), and time attributes (TA), and is collectively represented as DN-1_USA[PA,TA].

Each demo matrix element for each network includes program attributes, and time attributes, which may be represented as a matrix [PA,TA]. Exemplary time attributes may comprise the following:

Quarter, Year (if necessary), which may be represented as variables;

Daily seasonality, which may be represented as a linear combination of trigonometric functions;

Day of week (DOW), which may be represent as variables;

Half hour, which may be represented as variables, for example, 8:00-8:30, 8:30-9:00;

Holidays and special events, for example, Super Bowl, Labor Day Sunday and Monday, $4^{th}$ of July (Independence Day), Christmas Day, and New Year's Eve, and may be represented as variable.

Exemplary program attributes may comprise the following:

Genre by network/competitor:
  a. "light content" (soap, comedy, variety, game, music, reality);
  b. "heavy content" (documentary, drama, current affairs, news, science, travel);
  c. sport;
  d. Movies; and
  e. News;
    for each type of competitor (bucket), for example, Broadcast light content, Non-Owned Cable light content;
Repeat/Premiere/Live (from Nielsen)
Duration (in min)
Same program indicator—half hour (hhr) is within same program as previous (calculated)
Lead in genre match—half hour (hhr) starts a program similar with previous hhr's program (calculated), where genre is light, heavy, sports or movies It should be recognized by those skilled in the art that other time attributes and/or program attributes may be utilized without departing from the spirit and/or scope of the various embodiments of the disclosure.

For a given 30-minute period, the probability of a consumer choosing to watch what is on a particular channel is a function of what is currently airing on that particular channel, and what the competitors are airing within the same 30-minute period. For example, the probability for a consumer watching TBS network for a given 30-minute period, $P_{hhr,TBS}$ may be represented by the following expression:

$$P_{hhr,TBS} = \frac{e^{\beta_{TBS} \cdot x_{Phhr,TBS}}}{\sum_{i=TBS}^{Others} e^{\beta_i \cdot x_{Phhr,i}}} \quad \text{(equation 1)}$$

where:
x=program attributes and time attributes;
β=vector of weights to be estimated for a particular network e.g. $\beta_{TBS}$=vector of weights to be estimated for TBS.

The program attributes and time attributes may be referred to as covariates, and may be received from one or more entities and/or storage devices that provide media analytical information, for example, Nielsen.

The $P_{hhr,TBS}$ for equation 1 may be simplified and represented as:

$$\ln(\text{Demo}(000))_{hhr,TBS} = \beta_{TBS} \cdot x_{Phhr,TBS} \quad \text{(equation 2)}$$

In accordance with an exemplary embodiment of the disclosure, equation 2 may be estimated through minimizing squared errors (MSE) utilizing non-linear optimization.

In accordance with various embodiments of the disclosure, the competitor networks may be bucketized, i.e. placed into buckets or bins. The following illustrates are exemplary competitor buckets:

Owned competitors—for example, TBS, TNT, ADSM, TruTV, etc are owned by the same entity, and thus compete against each other;

Broadcast competitors—ABC, CBS, NBC, FOX, CW, ION;

Non-Owned cable competitors—USA, Spike, FX, A&E, Lifetime, CMDY; and

All other networks.

The base matrix 200 as illustrated contains data for a single day. The structure of the base matrix 200 may be replicated 365 times and populated with the corresponding program attributes and time attributes for a single year. This resulting structure may be replicated and populated with the corresponding program attributes and time attributes to provide a corresponding plurality of years of data.

Figure 2B:
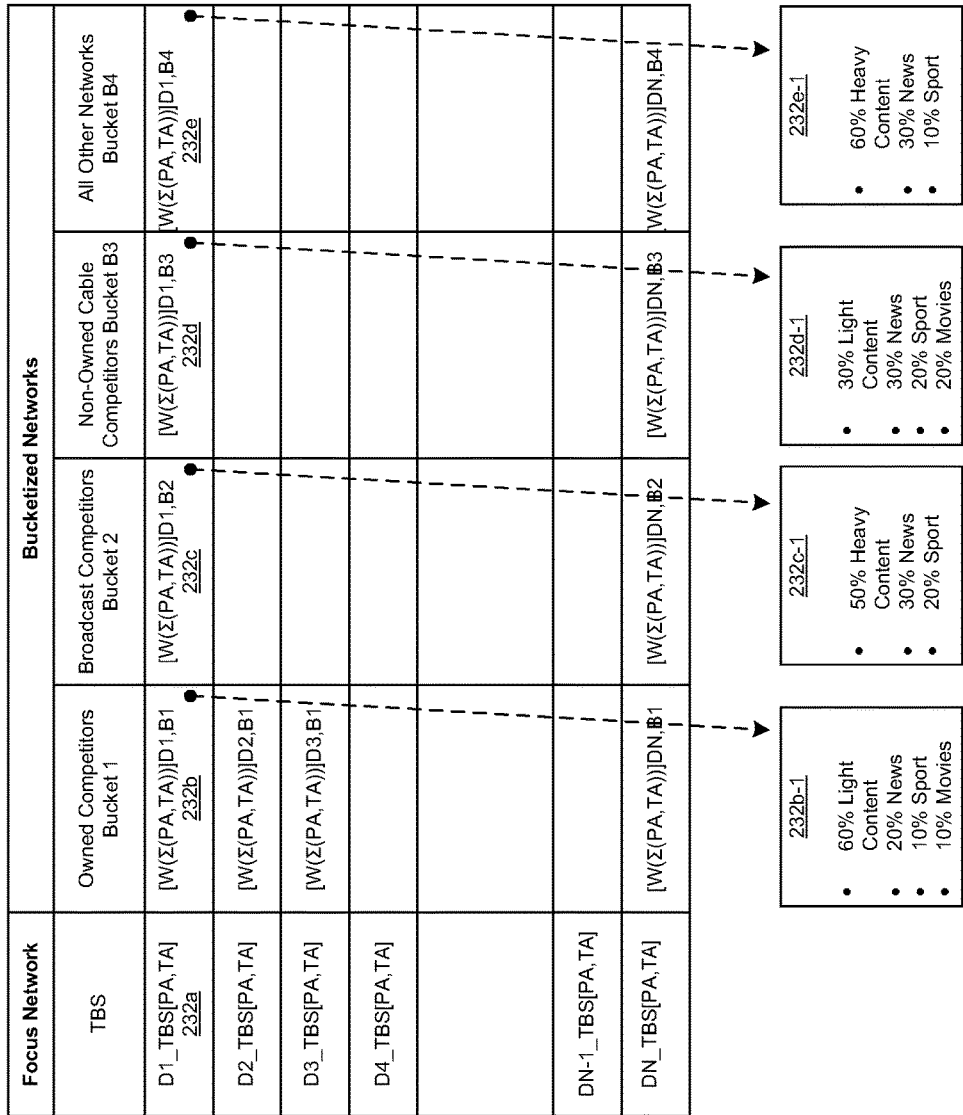
FIG. 2B is a diagram that illustrates a focus network determination for the framework for audience rating estimation for the media system of FIG. 2A, in accordance with various exemplary embodiments of the disclosure.

FIG. 2B is a diagram that illustrates a focus determination for the framework for audience rating estimation for a media system of FIG. 2A, in accordance with various exemplary embodiments of the disclosure. Referring to FIG. 2B, there is shown an exemplary focus matrix 230 including a focus network, TBS, and the bucketized networks in buckets, B1, B2, B3, and B4. The focus matrix 230 represents information for the 0-30 minute period of the base matrix 200 illustrated in FIG. 2A. A similar matrix may be generated for each remaining 23 time periods for TBS, which are illustrated in FIG. 2A.

Consider the first demo D1 in the 0-30 minute period (FIG. 2A), for TBS, with the program attributes PA, and time attributes TA, collective referenced as D1_TBS[PA,TA], 232a. The values for D1_TBS[PA,TA] are acquired from the demo matrix element 210a, in FIG. 2A. For the first demo D1, a vector of the sum (Σ(PA,TA)) of program attributes and the time attributes for the each of the owned competitor networks, which are in bucket 1 is determined. The vector of the sum (Σ(PA,TA)) is determined by adding the individual contribution for each owned competitor network in bucket B1, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B1 is weighted. The resulting weighted vector for the summed attributes of content for the networks in bucket B1, may be represented as [W(Σ(PA,TA))|D1,B1]. An example weighted vector for the summed attributes of content for the networks in bucket B1 may comprise 60% light content, 20% news, 10% sport, and 10% movies, and is represented by reference number 232b-1.

Bucket B2 is handled in a similar manner as bucket B1. In this regard, the vector of the sum (Σ(PA,TA)) is determined by adding the individual contribution for each owned competitor network in bucket B2, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B2 is weighted. The resulting weighted vector for the summed attributes of content for the networks in bucket B1, may be represented as [W(Σ(PA,TA))]D1,B2]. An example weighted vector for the summed attributes of content for the networks in bucket B2 may comprise 50% heavy content, 30% news, and 20% sport, and is represented by reference number 232c-1.

Bucket B3 is handled in a similar manner as buckets B1, and B2. In this regard, the vector of the sum (Σ(PA,TA)) is determined by adding the individual contribution for each owned competitor network in bucket B3, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B3 is weighted. The resulting weighted vector for the summed attributes of content for the networks in bucket B3, may be represented as [W(Σ(PA,TA))]D1,B3]. An example weighted vector for the summed attributes of content for the networks in bucket B2 may comprise 30% light content, 30% news, 20% sport, and 20% movies, and is represented by reference number 232d-1.

Bucket B4 is handled in a similar manner as buckets B1, B2, and B3. In this regard, the vector of the sum (Σ(PA,TA)) is determined by adding the individual contribution for each owned competitor network in bucket B4, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B4 is weighted. The resulting weighted vector for the summed attributes of content for the networks in bucket B4, may be represented as [W(Σ(PA,TA))]D1,B3]. An example weighted vector for the summed attributes of content for the networks in bucket B4 may comprise 60% light content, 30% news, and 10% sport, and is represented by reference number 232e-1.

The value of $\beta_{TBS}$ vector for Demo D1, for period 0-30 minute period is then determined by aggregating the resulting weighted vector for the summed attributes of content for the networks in buckets B1, B2, B3, and B4. In this regard, $$\beta_{TBS,D1,(0-30)} = \text{Aggregate}[[W(\Sigma(PA,TA))]D1,B1],[W(\Sigma(PA,TA))]D1,B2],[W(\Sigma(PA,TA))]D1,B3],[W(\Sigma(PA,TA))]D1,B4]]$$

This may be repeated for all the demos in the 0-30 minute period, so that each demo may have a corresponding β vector. Once all the demos for the 0-30 minute period are completed, the entire process may be repeated for the second 30-minute period (30-60), and so on until all corresponding values of β for all demos in the $48^{th}$ 30 minute period are completed.

The model illustrated in FIGS. 2A and 2B may be utilized for predictive modeling to determine viewership for an upcoming quarter. Once the β vector for a particular network is determined, this may be utilized to forecast or predict the viewership for an upcoming quarter for the particular network. In order to forecast the viewership for TBS for the upcoming quarter, the program schedule for the TBS and the program schedule for the competing networks are needed. Assume that today is Apr. 5, 2015, which is roughly the start of the second quarter 2Q15, and that the model illustrated in FIG. 2A and FIG. 2B includes data for the prior four quarters, namely, 2Q14, 3Q14, 4Q14, and 1Q15. Furthermore, it is assumed that all ratings and viewership information, for example, Nielsen data, for all prior periods have been received and are included in the model illustrated in FIG. 2A and FIG. 2B.

While the program schedule for the TBS network for 2Q15 is known, the program schedule for the competitors may not be known. However, it may be assumed that the mix of program for the upcoming quarter is the same as it was for the same quarter in the prior year. Accordingly, an assumption is made that the mix of program for 2Q15 is approximately the same as the mix of program in 2Q14, which may be determined from the bucketized networks as illustrated in FIG. 2B (e.g. 231b-1, 232c-1, 232d-1, 232e-1). If it is known that there is a change to the programming in a particular bucket, then the program mix in the bucket may be adjusted accordingly. This information may be utilized to forecast the viewership for every demo, and for every 30-minute period in the upcoming quarter utilizing the values that were calculated for β. The entire process may be repeated for other networks in order to forecast viewership for those other networks for the upcoming quarter. Furthermore, the various embodiments of the disclosure are not limited to forecasting the current quarter, Q215. Accordingly, the model presented in FIG. 2A and FIG. 2B may also to utilize to forecast or predict viewership for 3Q15, for example.

Since consumer behavior is constantly changing, the β vector for a particular network may be updated based on these changes in the consumer behavior. Accordingly, for example, once all the data for a quarter has been received, the β vector for each particular network may be updated to reflect the changes in consumer behavior.

Although the various embodiments of the disclosure presented with respect to the model in FIG. 2A and FIG. 2B are utilized to predict the viewership for an owned network, it should be recognized that the disclosure is not limited in this regard. Accordingly, the model in FIG. 2A and FIG. 2B may also be utilized to predict viewership for competitor networks.

The digital age allows individual tracking of consumers by sellers/advertisers since the sellers know the viewers they are interacting with and can more readily learn their habits and preferences. Consumers and viewers are tracked based on online preferences, tracking cookies, Internet browsing habits, and location based services (LBS) to name a few. Based on this knowledge and habits of the consumers and viewers, data from a plurality of data analytics sources may be fused together to provide more granular results. In this regard, analytical information provided for a particular demo may give a breakdown of one or more categories that may fall within that particular demo. For example, within the demo for people age 25-54, P[25-54], at the $39^{th}$ 30-minute period (7:30-8:00 pm), which has a viewership of 1 M, 500 K of the 1 M viewers are cereal buyers. Given such granularity, an advertiser of cereal would be more interested in targeting the 500 K cereal buyers rather that the entire 1 M viewers.

Although targeting may operate with similar constraints as advertisement scheduling, aspects of targeting may be geared towards targeting segments of a certain population on a more granular level. For example, consider the target [auto intenders], which includes people who intent to by automobiles. The target [Auto intenders] may comprise, a first level of sub-targets, for example, [Ford branded autos], [Toyota branded autos], [Honda branded Autos}, and so on. Each of the first level of sub-targets may comprise a second level of sub-targets. For example, target [Ford branded autos] may comprise second level sub-targets [Ford Sedans], [Ford SUVs], [Ford Trucks], and target [Toyota branded autos]

may comprise second level sub-targets [Toyota Sedans], [Toyota SUVs], [Toyota Trucks], [Toyota Cross Overs], and so on. The second level sub-targets [Ford Trucks] may comprise third level sub-targets, for example, [Ford light trucks], and [Ford heavy duty trucks]. This level of granularity enables targeting to zero in on specific segments to provide a certain percentage lift during placement of targeting spots. Additional sub-levels of targets may be employed without departing from the spirit and scope of the disclosure.

The model illustrated in FIG. 2A, and FIG. 2B may be modified such that the demos D1, D2, D3, . . . , DN may be replaced by targets, and a β vector may be determined for each of the targets and for each of the networks. Exemplary targets may comprise cereal buyers, yogurt buyers, credit card buyers, luxury car buyers, buyers of US made cars, and buyers of foreign made cars. A matrix of the targets may be generated and advertisement may be more efficiently scheduled based on how targeting deals are sold.

Figure 2C:
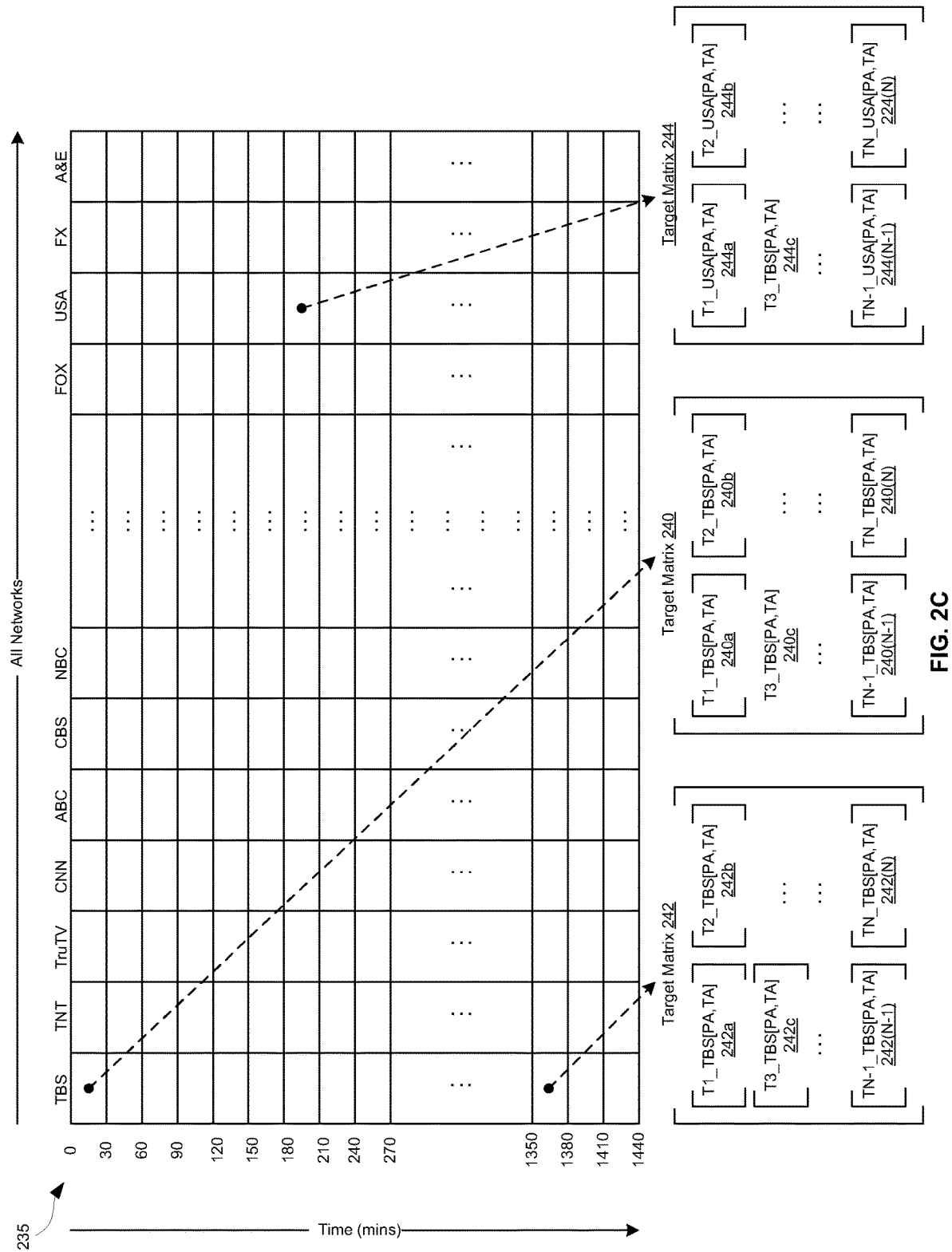
FIG. 2C is a diagram that illustrates an exemplary target matrix, in accordance with various exemplary embodiments of the disclosure.

FIG. 2C is a diagram that illustrates an exemplary target matrix, in accordance with various exemplary embodiment of the disclosure. Referring to FIG. 2C, there is shown target matrix 235, which comprises exemplary target matrix 240, 242, and 244, each having corresponding elements referenced as 240a, 240b, 240c, . . . , 240(N−1), 240(N); 242a, 242b, 242c, . . . , 242(N−1), 242(N); and 244a, 244b, 244c, . . . , 244(N−1), 244(N), respectively.

Figure 2D:
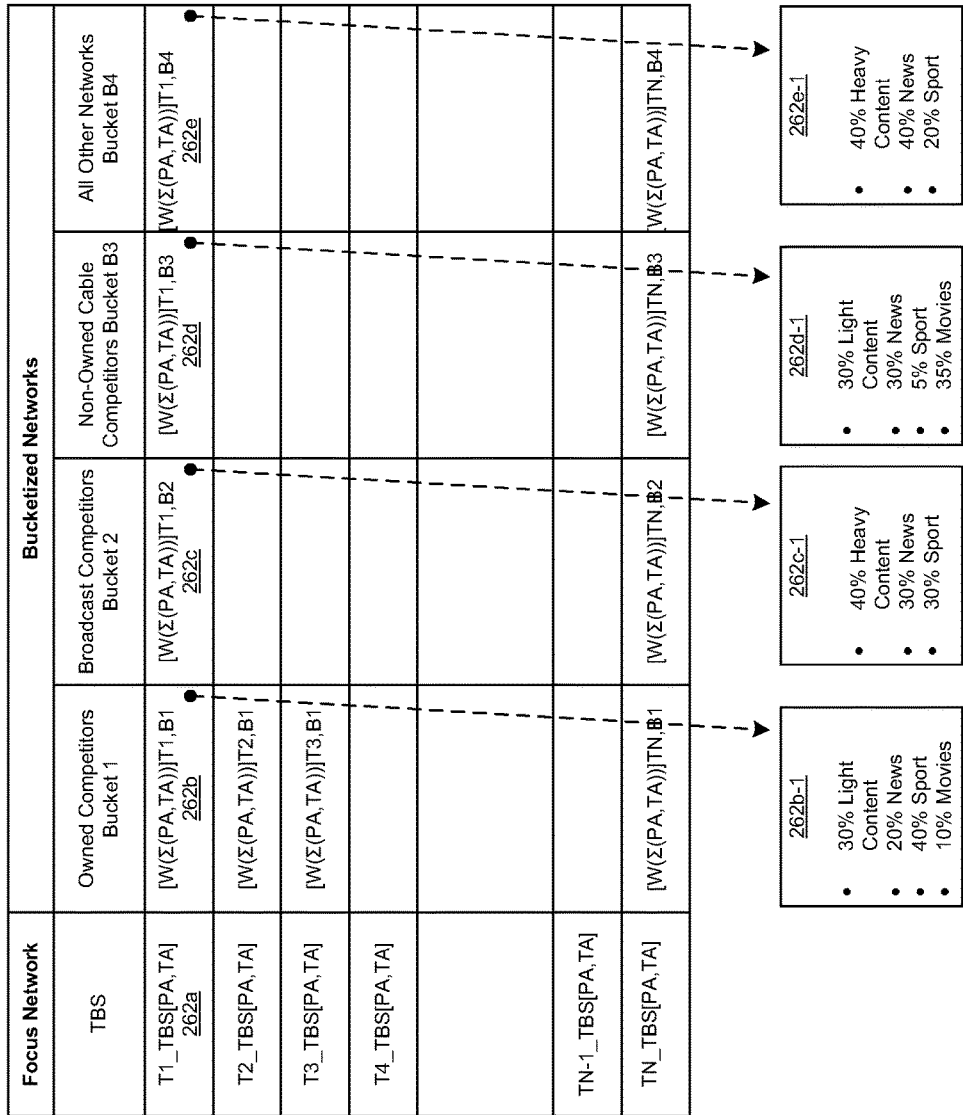
FIG. 2D is a diagram that illustrates a focus network determination for the framework for audience rating estimation based on the target matrix of FIG. 2C, in accordance with various exemplary embodiments of the disclosure.

FIG. 2D is a diagram that illustrates a focus determination for the framework for audience rating estimation based on the target matrix of FIG. 2C, in accordance with various exemplary embodiments of the disclosure. Referring to FIG. 2D, there is shown an exemplary focus matrix 260 including a focus network, TBS, and the bucketized networks in buckets, B1, B2, B3, and B4. The focus matrix 230 represents information for the 0-30 minute period of the base matrix 200 illustrated in FIG. 2A. A similar matrix may be generated for each remaining 23 time periods for TBS, which are illustrated in FIG. 2A.

Consider the first target T1 in the 0-30 minute period (FIG. 2A), for TBS, with the program attributes PA, and time attributes TA, collective referenced as T1_TBS[PA,TA], 232a. The values for T1_TBS[PA,TA] are acquired from the demo matrix element 240a, in FIG. 2C. For the first target T1, a vector of the sum (Σ(PA,TA)) of program attributes and the time attributes for the each of the owned competitor networks, which are in bucket 1 is determined. The vector of the sum (Σ(PA,TA)) is determined by adding the individual contribution for each owned competitor network in bucket B1, which is found in the row for 0-30 minute (first 30-minute) period of the base matrix 235 illustrated in FIG. 2C for a period of, for example, 1 year. Since different shows may be presented in the 0-30 minute period, the vector of the sum (Σ(PA,TA)) for bucket B1 is weighted. The resulting weighted vector for the summed attributes of content for the networks in bucket B1, may be represented as [W(Σ(PA,TA))]T1,B1]. An example weighted vector for the summed attributes of content for the networks in bucket B1 may comprise 30% light content, 20% news, 40% sport, and 10% movies, and is represented by reference number 262b-1.

Bucket B2 is handled in a similar manner as bucket B1. In this regard, the vector of the sum (Σ(PA,TA)) is determined by adding the individual contribution for each owned competitor network in bucket B2, which is found in the row for 0-30 minute (first 30-minute) period of the base matrix 235 illustrated in FIG. 2C, for a period of, for example, 1 year. Since different shows may be presented in the 0-30 minute period, the vector of the sum (Σ(PA,TA)) for bucket B2 is weighted. The resulting weighted vector for the summed attributes of content for the networks in bucket B1, may be represented as [W(Σ(PA,TA))]T1,B2]. An example weighted vector for the summed attributes of content for the networks in bucket B2 may comprise 40% heavy content, 30% news, and 30% sport, and is represented by reference number 262c-1.

Bucket B3 is handled in a similar manner as buckets B1, and B2. In this regard, the vector of the sum (Σ(PA,TA)) is determined by adding the individual contribution for each owned competitor network in bucket B3, which is found in the row for 0-30 minute (first 30-minute) period of the base matrix 235 illustrated in FIG. 2C, for a period of, for example, 1 year. Since different shows may be presented in the 0-30 minute period, the vector of the sum (Σ(PA,TA)) for bucket B3 is weighted. The resulting weighted vector for the summed attributes of content for the networks in bucket B3, may be represented as [W(Σ(PA,TA))]T1,B3]. An example weighted vector for the summed attributes of content for the networks in bucket B2 may comprise 30% light content, 30% news, 5% sport, and 35% movies, and is represented by reference number 262d-1.

Bucket B4 is handled in a similar manner as buckets B1, B2, and B3. In this regard, the vector of the sum (Σ(PA,TA)) is determined by adding the individual contribution for each owned competitor network in bucket B4, which is found in the row for 0-30 minute (first 30-minute) period of the base matrix 235 illustrated in FIG. 2C, for a period of, for example, 1 year. Since different shows may be presented in the 0-30 minute period, the vector of the sum (Σ(PA,TA)) for bucket B4 is weighted. The resulting weighted vector for the summed attributes of content for the networks in bucket B4, may be represented as [W(Σ(PA,TA))]T1,B3]. An example weighted vector for the summed attributes of content for the networks in bucket B4 may comprise 40% light content, 40% news, and 20% sport, and is represented by reference number 262e-1.

The value of $\beta_{TBS}$ vector for target T1, for period 0-30 minute period is then determined by aggregating the resulting weighted vector for the summed attributes of content for the networks in buckets B1, B2, B3, and B4. In this regard, $$\beta_{TBS,T1,(0-30)}=\text{Aggregate}[[W(\Sigma(PA,TA))]T1,B1],[W(\Sigma(PA,TA))]T1,B2],[W(\Sigma(PA,TA))]T1,B3],[W(\Sigma(PA,TA))]T1,B4]]$$

This may be repeated for all the targets in the 0-30 minute period, so that each target may have a corresponding β vector. Once all the targets for the 0-30 minute period are completed, the entire process may be repeated for the second 30-minute period (30-60), and so on until all corresponding values of β for all targets in the $48^{th}$ 30-minute period are completed.

A composite matrix comprising demos and targets may be generated, based on, for example, FIG. 2B, and FIG. 2D.

Figure 3:
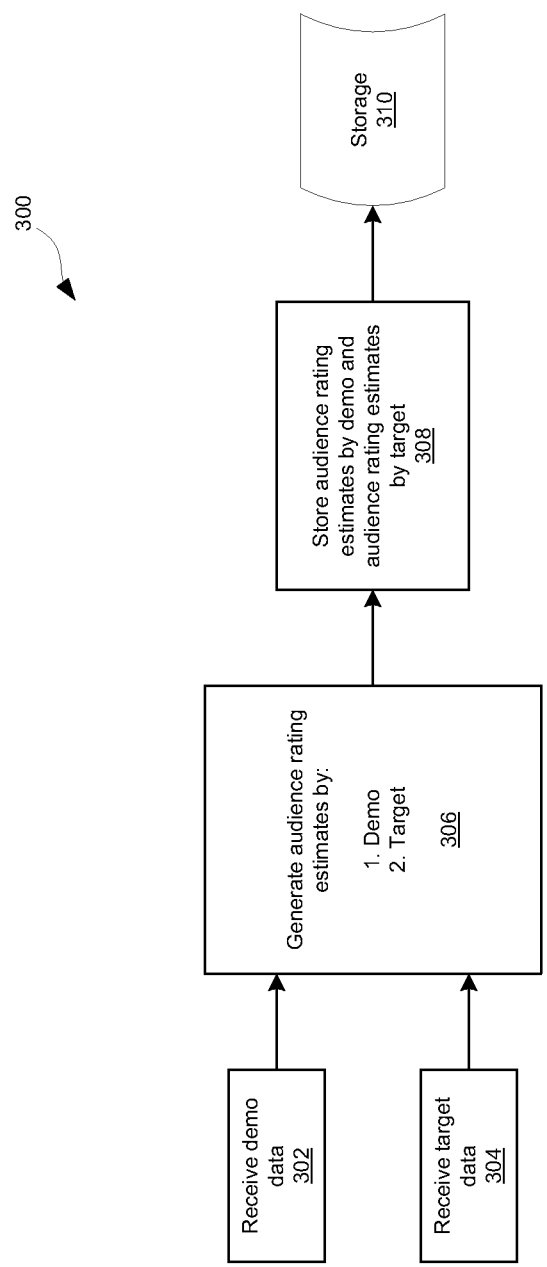
FIG. 3 is a flow diagram illustrating exemplary generation of estimates based on demographics and targets, in accordance with various exemplary embodiments of the disclosure.

FIG. 3 is a flow diagram illustrating exemplary generation of estimates based on demographics and targets, in accordance with various exemplary embodiment of the disclosure. Referring to, there is shown steps 302 through 304, and a storage 310.

In step 302, demographics data is received by the advertisement management system 100. In step 304, target data is received by the advertisement management system 100. In step 306, audience rating estimates are generated by (1) demographics based on the received demographics data, and (2) target based on the received target data. In step 308, the audience rating estimates by demographics and by audience rating estimates by target may be stored in the storage 310. The storage 310 may be, for example, any kind storage device such as a disc, solid state memory, or other storage system such as a network attached storage system (NAS) or cloud-based storage system. The audience rating estimates by demographics and by target may be stored in a database within the storage 310.

In accordance with various embodiments of the disclosure, only a portion of deals that are made may be designated as targeting deals, and not all the orders in a targeting deal have to be targeting orders. Accordingly, some deals may have no targeting orders, while other deals may have one or more targeting orders. Furthermore, it is desirable to identify inventory that can provide a certain lift when placing one or more targeting spots which could be provided certain percentage lift. The lift refers to a certain percentage over the baseline target delivery. For example, only the top 10% of the inventory for cereal buyers that could be provided a certain percentage lift may be targeted during the $39^{th}$ period. The placement for the spot may be modified so that the cereal advertisement is presented during the $39^{th}$ period when viewership of cereal buyers is at a maximum. One or more administration (admin) parameters may be utilized to set a default lift, and the default lift may be modified using the admin parameters.

In accordance with various embodiments of the disclosure, targeting and advertisement scheduling may be integrated. For advertisement scheduling, it is desirable to maximize delivery for candidate deals that are not pacing as expected in order to reduce the liability. For targeting, it is desirable to utilize the inventory that could provide a certain percentage lift when placing the targeting spots. Since there may be a high correlation between the placement of the targeting spots and the placement of the advertisement scheduling spots, the placement of the targeting spots should not consume all the available spots since this would not permit the placement of the advertisement scheduling spots to reduce the liability. In order to address this issue, a baseline target delivery may be determined for each target. The spots may then be placed to achieve a determined lift based on the baseline target delivery. For example, target A has a mean or median target delivery of 100. In order to provide a 25% lift, the baseline target delivery for target A would be 125 after placement. The determined lift is carefully determined in order to prevent over-delivery and unnecessary consumption of the inventory bucket, thereby limiting the number of inventory that may be available for advertisement scheduling. The delivery over the desired lift of spots cannot be reclaimed. For example, if the lift needed were only 10%, then providing a lift of 25% would result in a 15% additional delivery what is expected.

The average target delivery may be determined by summing all the delivery for a particular target in a 30-minute period within a bucket, and dividing by the number of deliveries of the target that occur within the 30-minute period within that bucket.

The median target delivery may be computed for each audience segment/order on each given network/selling title/week combination. The computation may be based on, for example, two main inputs, namely, (1) estimated audience segment delivery of all the half hours within that week that correspond to the parent selling title; and (2) the number of spots (regardless of length) in the corresponding order that are scheduled in that parent selling title/week.

Let L represent list of half hours that correspond to the parent selling title/week
Let n=size of L (number of half hours); and
Let m represent number of spots in that parent selling title/week in the corresponding order.

The median schedule delivery may be computed as follows:
1. Let $L^S$ be L sorted in descending order of audience segment delivered. $L^S(i)$ refers to the i-th element of $L^S$, i=1, 2, . . . , n.
2. Let r=m mod n and $$c = \left\lfloor \frac{m}{n} \right\rfloor$$

a. If r and n have the same parity [i.e., either n is odd and r is odd or n is even and r is even]

$$\text{Median Schedule Delivery} = c\sum\nolimits_{i=1}^{n} L^S(i) + \sum\nolimits_{i=\left(\frac{r-m+2}{2}\right)}^{\left(\frac{r+m}{2}\right)} L^S(i)$$

b. Else [i.e., r and m have different parities].

$$\text{Median Schedule Delivery} = c\sum\nolimits_{i=1}^{n} L^S(i) + \sum\nolimits_{i=\left(\frac{r-m+1}{2}\right)}^{\left(\frac{r+m-1}{2}\right)} L^S(i)$$

The baseline target delivery, which may be a mean target delivery or a median target delivery, may also be dynamically modified or changed over time based on actual accruals. In this regard, if the actual target is lower than the forecasted target, the lift goal may be increased in order to increase the viewership. It should be recognized that other metrics may be utilized without departing from the spirit and scope of the various embodiments of the disclosure.

In accordance with various embodiments of the disclosure, targeting may or may not be a guaranteed service and for targeting spots that are not delivered, extra spots may sometime be provided as compensation. In one exemplary embodiment of the disclosure, the demo delivery may be guaranteed, but the expected lift may not be guaranteed. In another exemplary embodiment of the disclosure, the demo delivery may be guaranteed, and the expected lift may also be guaranteed. In another exemplary embodiment of the disclosure, the lift may be guaranteed, but the demo delivery may not be guaranteed.

Figure 4:
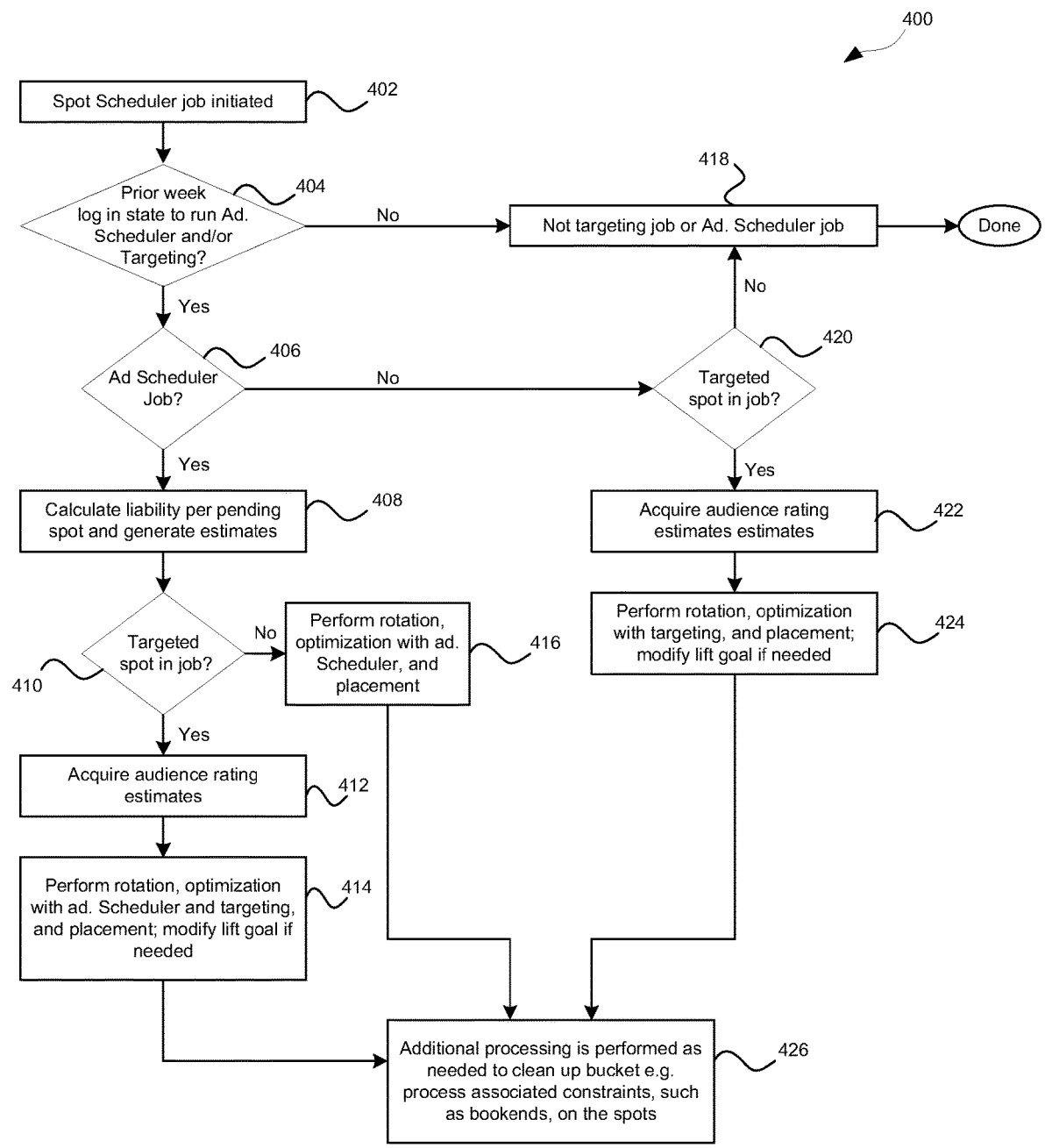
FIG. 4 is a flow chart illustrating exemplary steps for providing spot scheduling with advertisement scheduling, and/or targeting, in accordance with various exemplary embodiments of the disclosure.

FIG. 4 is a flow chart illustrating exemplary steps for providing spot scheduling with advertisement scheduling, and/or targeting, in accordance with various exemplary embodiments of the disclosure. Referring to FIG. 4, there is shown exemplary steps 402 through 426. The exemplary steps 402 through 426 may be performed by one or more of the components and functions of the television management system 100.

In step 402, the spot scheduler job is initiated. In step 404, it is determined whether the prior week log is in a state to run advertisement scheduler and/or targeting. If in step 404 it is determined that the prior week log is not in a state that allows running of the advertisement scheduler or targeting, then in step 418, the job is not a targeting job or advertisement scheduler job. The exemplary steps may end thereafter. If in step 404 it is determined that the prior week log is in a state to run advertisement scheduler or targeting, then in step 406, it is determined whether the job is an advertisement scheduler job.

In step 406, if it is determined that the job is an advertisement scheduler job, then in step 408, the liability per pending spot is calculated and corresponding estimates are generated. The exemplary steps then proceed to step 410, where it is determined whether there is a targeted spot in the job. In step 410, if it is determined that there is a targeted spot, then in step 412, the audience rating estimates are acquired. For example, the audience rating estimates may be acquired from the storage 310 (FIG. 3). In step 414, rotation, optimization with advertisement scheduling and targeting, and placement are performed, and the lift goal may be modified if needed. In step 414, when performing targeting, it is determined whether the goals are achievable. If it is determined that the goals are not achievable, then the goals may be modified so that they are achievable. For example, if the goal is to provide a lift of 25%, and it is determined that only a lift of 23% may be provided, then the goal is modified to provide a lift of 25%. In step 410, if it is determined that the spots are not targeted spots, then in step 416, rotation, optimization with advertisement scheduling, and placement are performed.

In step 406, if it is determined that the job is not an advertisement scheduler job, then in step 420, it is determined whether there is a targeted spot in the job. In step 420, if it is determined that there is no targeted spot in the job, then in step 418, the job is not a targeting job or an advertisement scheduler job, and the exemplary step end thereafter. In step 420, if it is determined that there is a targeted spot in the job, then in step 422, the audience rating estimates are acquired. For example, audience rating estimates may be acquired from the storage 310 (FIG. 3). In step 424, rotation, optimization with targeting, and placement are performed, and the lift goal may be modified if needed. In step 424, when performing targeting, it is determined whether the goals are achievable. If it is determined that the goals are not achievable, then the goals may be modified so that they are achievable. For example, if the goal is to provide a lift of 20%, and it is determined that only a lift of 16% may be provided, then the goal is modified to provide a lift of 16%.

Subsequent to step 414, step 416, and step 424, step 426 is performed. In step 426, additional processing is performed as needed to clean up the bucket. In this regard, processing of associated constraints, such as adjusting bookends, may be done on the spots. For example, two spots may be connected and needs to be processed together.

In accordance with an exemplary embodiment of the disclosure, the resulting estimates or the updated/adjusted estimates may be weighted by a weighting factor. The weighting factor may be generated based on historical analysis of demographics estimates, for every demographics, for every network including what is airing on the networks of competitors, at the 30-minute interval, and for an extended period, for example, one or more months, or one or more years. The weighting factor may take on a range of values, each of which may be updated.

In instances where the estimates may be dependent on previous estimates, then a weighting factor may be utilized in combination with the previous estimate to weigh the error of the previous estimate and measurement. The weighting factor may be: (i) a constant: it may be a system parameter chosen based on data and model performance analysis, for example, prior to system roll out. This constant can be reassessed, if need, periodically e.g. yearly; (ii) time-varying: the weight changes at every time step depending on the estimates and observations variance; (iii) adaptive: the weight changes at every time step as a function of the estimates error variance. In this regard, the adaptive weight may be viewed as time varying as a function of error.

Figure 5:
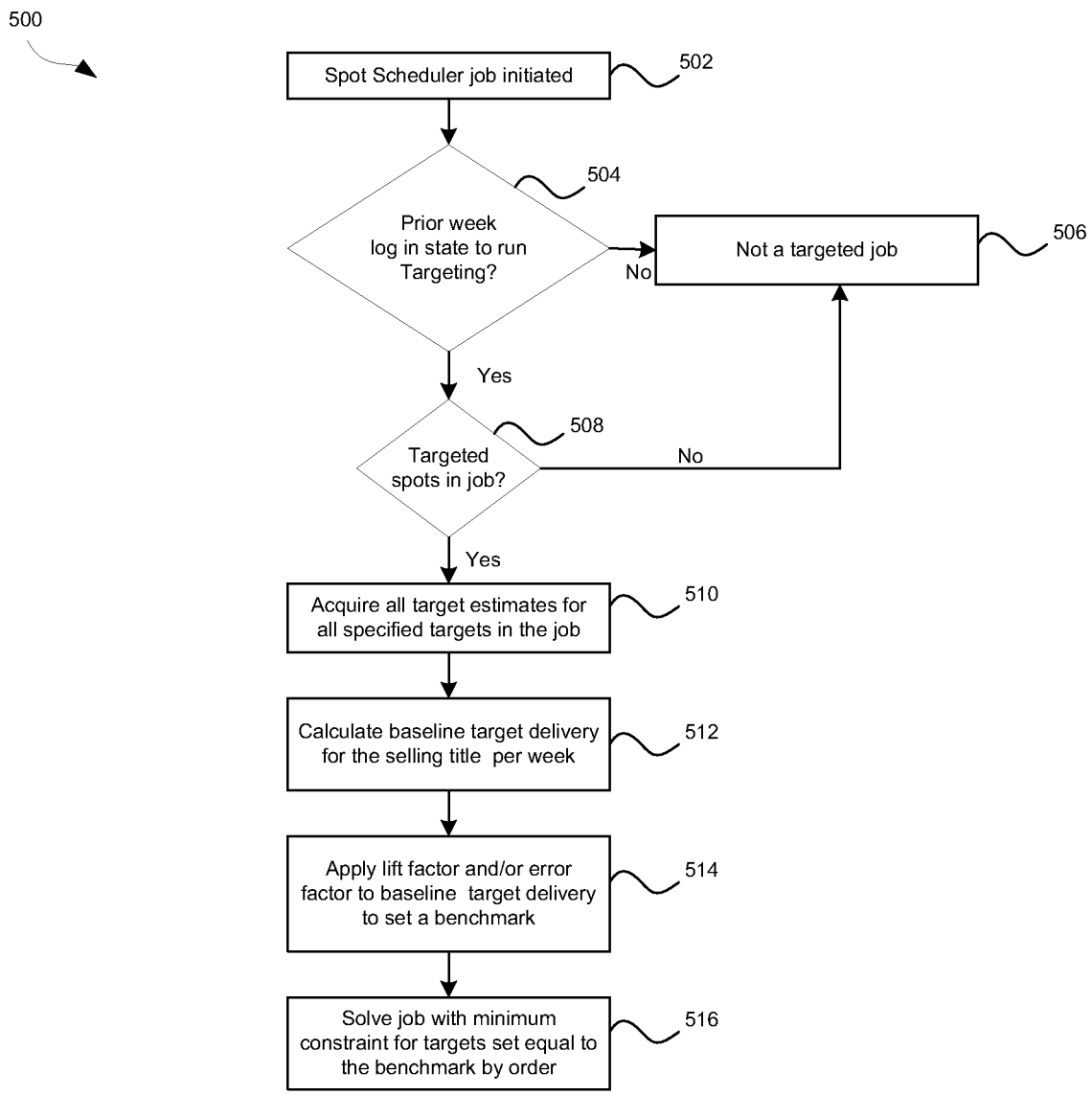
FIG. 5 is a flow chart illustrating exemplary steps for providing spot scheduling with targeting, in accordance with various exemplary embodiments of the disclosure.

FIG. 5 is a flow chart illustrating exemplary steps for providing spot scheduling with targeting, in accordance with various exemplary embodiments of the disclosure. Referring to FIG. 5, there is shown exemplary steps 502 through 516. The exemplary steps 502 through 516 may be performed by one or more of the components and functions of the television management system 100.

In step 504, it is determined whether the prior week log is in a state to run targeting. If in step 504 it is determined that the prior week log is not in a state to run advertisement scheduler or targeting, then in step 506, it is not a targeted job or advertisement scheduler job.

If in step 504 it is determined that the prior week log is in a state to run advertisement scheduler or targeting, then in step 508, it is determined whether there are targeted spots in the job. In step 508, if it is determined that there are no targeted spots in the job, then in step 506, it is not a targeted job. If in step 508 it is determined that there are targeted spots in the job, then in step 510, all target estimates for all specified targets in the job are acquired. In step 512, the baseline target delivery for the selling title per week is calculated. In step 514, a lift factor and/or an error factor are applied to the baseline targeted delivery to set a benchmark. In step 516, the job is solved with minimum constraints for targets set equal to the benchmark by order.

Figure 6:
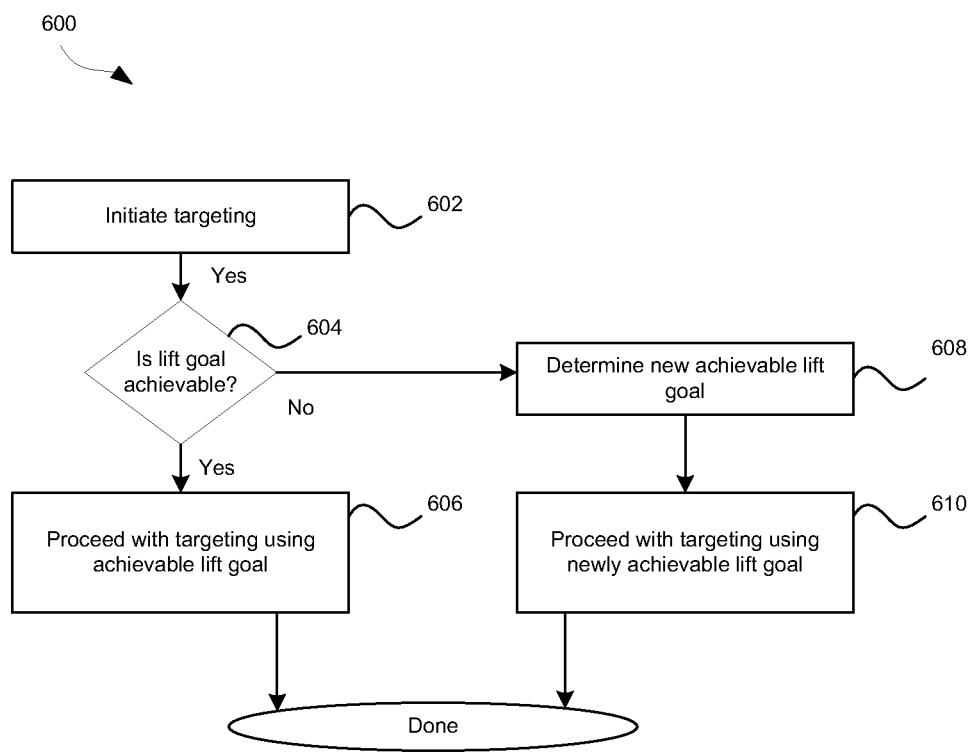
FIG. 6 is a flow chart illustrating modification of the lift goal, in accordance with an exemplary embodiment of the disclosure.

FIG. 6 is a flow chart illustrating modification of the lift goal, in accordance with an exemplary embodiment of the disclosure. Referring to FIG. 6, there are shown exemplary steps 602 through 610. The exemplary steps 602 through 610 may be executed by the targeting processor 113.

In step 602, targeting is initiated. In step 604, it is determined whether the lift goal is achievable. If in step 604 it is determined that the lift goal is not achievable, then in step 608, a new achievable lift goal is determined. In step 610, proceed with targeting using the newly achievable lift goal. If in step 604 it is determined that the lift goal is achievable, then in step 610, proceed with targeting using the achievable lift goal.

Figure 7:
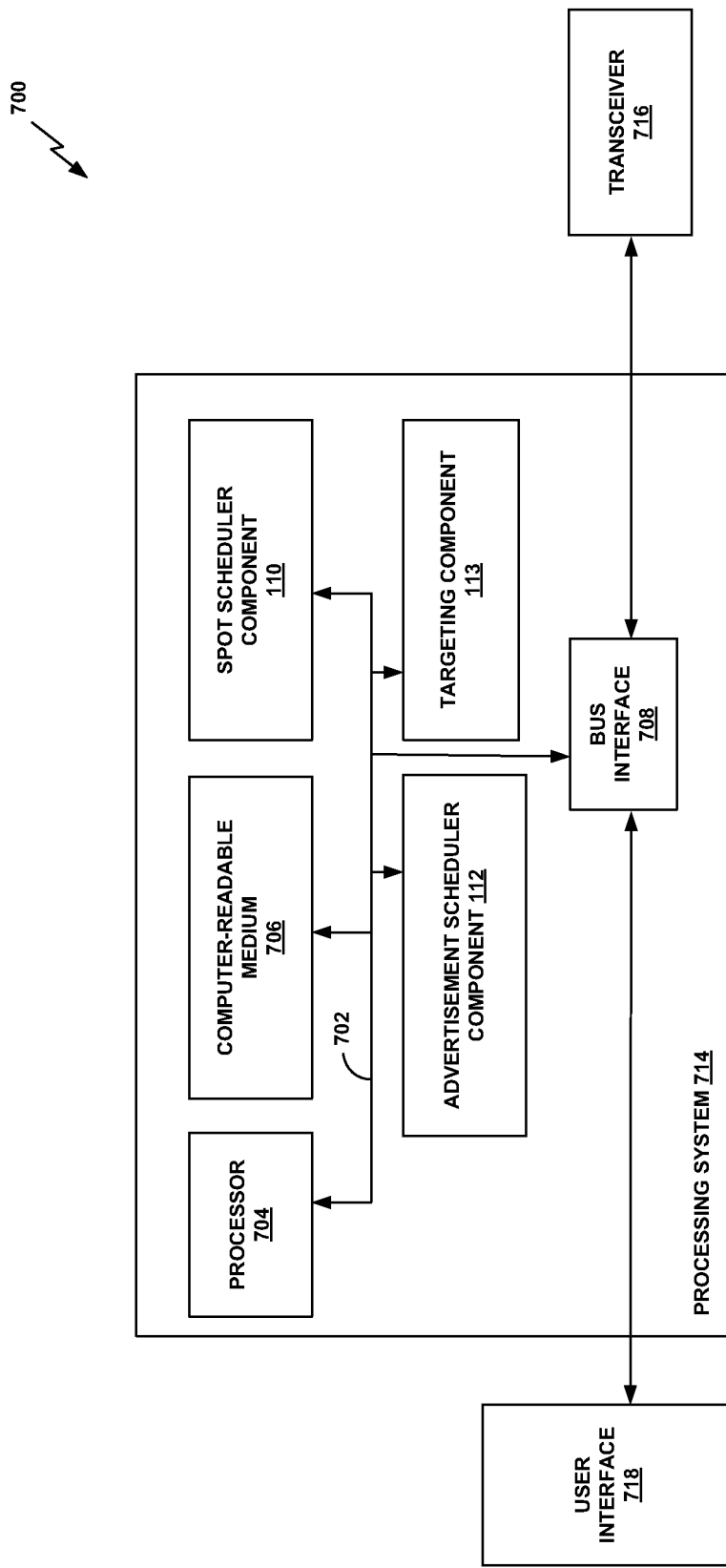
FIG. 7 is a conceptual diagram illustrating an example of a hardware implementation for a television advertisement management system employing a processing system for targeting and demographics scheduling utilizing a framework for audience rating estimation, in accordance with an exemplary embodiment of the disclosure.

FIG. 7 is a conceptual diagram illustrating an example of a hardware implementation for a television advertisement management system employing a processing system for targeting and demographics scheduling utilizing a framework for audience rating estimation, in accordance with an exemplary embodiment of the disclosure. Referring to FIG. 7, the hardware implementation for the television advertisement management system 100 of FIG. 1A employs a processing system 714 for targeting and demographics scheduling utilizing the framework for audience rating estimation, as described herein. In some examples, the processing system 714 may comprise one or more hardware processors 704, a spot scheduler solver component 110, an advertisement scheduler component 112, and a targeting component 113.

In this example, the television advertisement management system employing the processing system 714 may be implemented with a bus architecture, represented generally by the bus 702. The bus 702 may include any number of interconnecting buses and bridges depending on the specific implementation of the television advertisement management system 100 and the overall design constraints. The bus 702 links together various circuits including the one or more processors, represented generally by the processor 704, the computer-readable media, represented generally by the computer-readable medium 706, spot scheduler component 110, targeting component 113, (which correspond to the spot scheduler 110, advertisement scheduler 112, and targeting processor 113, respectively, illustrated in FIG. 1A), which may be configured to carry out one or more methods or procedures described herein.

The bus interface 708 provides an interface between the bus 702 and a transceiver 716. The transceiver 716 provides a means for communicating via the network 120 with various other apparatus such as the advertiser order generation systems 130a, . . . , 130n and the consumer devices 132a, . . . , 132n (FIG. 1A). The user interface 718 (e.g., keypad, display, speaker, microphone, pointing) may also be provided to enable a user to interact with the television advertisement management system 100 (FIG. 1A). In accordance with an aspect of the disclosure, the user interface may enable user interaction with the television advertisement management system 100. For example, the user interface 718 may be utilized to enter admin parameters.

The processor 704 may be operable to manage the bus 702 and general processing, including the execution of software stored on the computer-readable medium 706. In accordance with an embodiment of the disclosure, the processor 704 may be operable to control the operation of the television advertisement management system 100 (FIG. 1A), and may be operable to coordinate operation amongst the components therein, as well as with entities external to the television advertisement management system 100. The software, when executed by the processor 704, causes the television advertisement management system 100 to perform the various functions described infra for any particular apparatus. The computer-readable medium 706 may also be used for storing data that is manipulated by the processor 704 when executing software.

In an aspect, processor 704, computer-readable medium 706, or a combination of both may be configured or otherwise specially programmed to perform the functionality of the spot scheduler component 110, advertisement scheduler component 112, targeting component 113, components thereof, etc. (corresponding to the spot scheduler 110, advertisement scheduler 112, targeting processor 113, respectively, see FIG. 1A), or various other components described herein. For example, processor 704, computer-readable medium 706, or a combination of both may be configured or otherwise specially programmed to perform the functionality of the spot scheduler component 110, advertisement scheduler component 112, targeting component 113, components thereof, etc. described herein (e.g., the method 300 in FIG. 3, method 400 in FIG. 4, the method 500 in FIG. 5, the method 600 in FIG. 6, etc.), and/or the like.

Various embodiments of the disclosure may comprise an advertisement management system 100 that communicates with a plurality of advertiser order generation systems 130a, . . . , 130n, and electronically receives, via a communication network 120, deals comprising orders from the advertiser order generation systems 130a, . . . , 130n. The advertisement scheduler 112 may receive from the spot schedule solver 110, a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler 112 may determine which of one or more orders in one or more deals are targeting orders, and determine a baseline target delivery for the targeting orders based on expected viewership associated with the targeting orders. The targeting processor 113 may place a portion of the one or more spots for the targeting orders based on a lift goal over the baseline target delivery, and the advertisement scheduler 112 may determine a liability per pending spot for one or more spots that are determined to be candidates for advertisement scheduling. The advertisement scheduler 112 may reshuffle placement of a remaining portion of the one or more spots based on the liability per pending spot for the one or more spots that are determined to be candidates for advertisement scheduling so as to minimize liability associated with the one or more deals. The reshuffling is based on a forecast of expected viewership associated with the one or more spots that are determined to be candidates for advertisement scheduling. The advertisement scheduler 112 may generate a finalized commercial break schedule based on the reshuffling. The advertisement scheduler 112 concurrently places the portion of the one or more spots for the targeting orders based on a lift goal over the baseline target delivery, while the targeting processor 113 reshuffles placement of a remaining portion of the one or more spots based on the liability per pending spot for the one or more spots that are determined to be candidates for advertisement scheduling. In this regard, the advertisement scheduler 112 and the targeting processor operate concurrently.

The targeting processor 113 may determine a percentage lift for providing the determined baseline target delivery. In an embodiment of the disclosure, the baseline target delivery is a mean target delivery per selling title, and the mean target delivery per selling title is determined from a sum of all deliveries in a 30-minute period within the selling title divided by the number of 30-minute periods. In another embodiment of the disclosure, the baseline target delivery is a median target delivery per selling title. The targeting processor 113 may adjust the percentage lift based on accrued actual target delivery. The targeting processor 113 may adjust the lift goal if the accrued actual target delivery is less than forecasted.

The advertisement scheduler 112 may determine each target for each of the one or more targeting deals, and for each target, generate an estimate of the expected viewership associated with the one or more targeting deals. The advertisement scheduler 112 may determine each demographic for each of the one or more orders in the one or more deals, and generate, for each demographic, an estimate of the expected viewership associated with each of the one or more orders in the one or more deals. The advertisement scheduler 112 may modify the forecast of expected viewership associated with each of the one or more orders in the one or more deals regardless of whether or not the one or more targeting orders based on a weighting factor.

In accordance with an aspect of the disclosure, a framework for audience rating estimation may be utilized to generate, for example, an estimate of the percentage audience that may be doing a engaged in a certain activity. For example, the framework for audience rating estimation may generate a percentage average audience and/or a percentage total audience. In another aspect of the disclosure, the framework for audience rating estimation may generate an estimate of the actual number of persons that may be engaged in a certain activity. In this regard, the framework for audience rating estimation may generate an actual average audience or an actual total audience that may be engaged in a certain activity based on a generated forecast of the average total audience and a forecast of the total audience.

In accordance with an exemplary embodiment of the disclosure, the framework for audience rating estimation may take into account the nesting effect within a program. The nesting effect refers to the various factors that may affect the program. Each program may have a specific effect, and this effect may be referred to as the baseline effect. Each program has a fixed audience that is expected. Based on the factors that may affect the program, the framework for audience rating estimation may add or subtract from the fixed audience. For example, every 30-minute period may have an effect on the program, and seasonality or special events may have an effect on the program.

The concurrent operation of the advertisement scheduler 112, which places the portion of the one or more spots for the targeting orders based on a lift goal over the baseline target delivery, and the targeting processor 113, which reshuffles placement of a remaining portion of the one or more spots based on the liability per pending spot for the one or more spots that are determined to be candidates for advertisement scheduling enables the television advertisement management system 100 to operate more efficiently since the memory may be more efficiently utilized by the concurrent operations. The concurrent operation of placing spots for targeting orders and reshuffles placement of one or more spots based on the liability per pending spot for one or more spots that are determined to be candidates for advertisement scheduling also increases the operating speed (faster computation time without sacrificing accuracy) of the television advertisement management system 100 since a finalized commercial break schedule may more quickly be determined to create more focused advertising campaigns that better target the customers that will be exposed to the advertisement campaigns. For example, the concurrent operation and use of the data for the framework for audience rating estimation may utilize less memory than would otherwise be required resulting in much faster processing time.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for targeting and demographics scheduling utilizing the framework for audience rating estimation.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present invention has been described with reference to certain embodiments, it will be noted understood by, for example, those skilled in the art that various changes and modification could be made and equivalents may be substituted without departing from the scope of the present invention as defined, for example, in the appended claims. In addition, many modifications may be made to adapt a particular situation or material to the teachings of the present invention without departing from its scope. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Therefore, it is intended that the present invention not be limited to the particular embodiment disclosed, but that the present invention will include all embodiments falling within the scope of the appended claims.

What is claimed is:

1. A method, comprising:
   in an advertisement management system that comprises one or more hardware processors:
   electronically receiving, by the one or more hardware processors, one or more deals from a plurality of advertiser order generation systems, via a communication network, wherein the one or more deals comprise one or more orders from advertisers;
   receiving, by the one or more hardware processors, a commercial break schedule generated from a completed assignment of one or more first spots,
   wherein the one or more first spots correspond to the one or more deals comprising the one or more orders;
   determining, by the one or more hardware processors, which of the one or more orders in the one or more deals are targeting orders;
   calculating, by the one or more hardware processors, a baseline target delivery for the targeting orders based on expected viewership associated with the targeting orders;
   placing, by the one or more hardware processors, a portion of the one or more first spots for the targeting orders based on a lift goal over the baseline target delivery;
   determining, by the one or more hardware processors, a liability per pending spot for one or more second spots that are determined to be candidates for advertisement scheduling;
   determining a plurality of first matrices for a plurality of networks and for a plurality of fixed time periods,
   wherein each first matrix element of a first matrix of the plurality of first matrices for each network of the plurality of networks includes time attributes and program attributes;
   generating a second matrix for a fixed time period of the plurality of fixed time periods based on an aggregation of the time attributes and the program attributes for each first matrix element of the first matrix for each network;
   modifying, by the one or more hardware processors, a forecast of the expected viewership based on the plurality of first matrices and the second matrix, and
   wherein the forecast of the expected viewership is associated with the one or more second spots and each of the one or more orders in the one or more deals;
   reshuffling, by the one or more hardware processors, placement of a remaining portion of the one or more first spots concurrently with the placement of the portion of the one or more first spots, so as to minimize liability associated with the one or more deals,
   wherein the reshuffling is based on the liability per pending spot of the one or more second spots that are determined to be the candidates for the advertisement scheduling and based on the modified forecast of the expected viewership; and
   generating, by the one or more hardware processors, a finalized commercial break schedule based on the reshuffling.

2. The method according to claim 1, further comprising determining, by the one or more hardware processors, a percentage lift for providing the baseline target delivery.

3. The method according to claim 1, wherein the baseline target delivery is a mean target delivery per selling title.

4. The method according to claim 3, wherein the mean target delivery per selling title is determined from a sum of all deliveries in a 30-minute period within the selling title divided by a number of 30-minute periods.

5. The method according to claim 1, wherein the baseline target delivery is a median target delivery per selling title.

6. The method according to claim 2, wherein the percentage lift is adjustable based on accrued actual target delivery.

7. The method according to claim 6, further comprising adjusting, by the one or more hardware processors, the lift goal based on the accrued actual target delivery that is less than a forecasted target delivery.

8. The method according to claim 1, further comprising:
   determining, by the one or more hardware processors, a second target for each of one or more targeting deals; and
   generating, for the second target by the one or more hardware processors, an estimate of the expected viewership associated with the one or more targeting deals.

9. The method according to claim 1, further comprising:
   determining, by the one or more hardware processors, a second demographic for each of the one or more orders in the one or more deals; and
   generating, for the second demographic by the one or more hardware processors, an estimate of the expected viewership associated with each of the one or more orders in the one or more deals.

10. An advertisement management system, comprising:
    one or more hardware processors in a hardware advertisement scheduler configured to:
    electronically receive one or more deals from a plurality of advertiser order generation systems, via a communication network, wherein the one or more deals comprise one or more orders from advertisers;
    receive a commercial break schedule generated from a completed assignment of one or more first spots, wherein the one or more first spots correspond to the one or more deals comprising the one or more orders;
    determine which of the one or more orders in the one or more deals are targeting orders;
    calculate a baseline target delivery for the targeting orders based on expected viewership associated with the targeting orders;

place a portion of the one or more first spots for the targeting orders based on a lift goal over the baseline target delivery;

determine a liability per pending spot for one or more second spots that are determined to be candidates for advertisement scheduling;

determine a plurality of first matrices for a plurality of networks and for a plurality of fixed time periods, wherein each first matrix element of a first matrix of the plurality of first matrices for each network of the plurality of networks includes time attributes and program attributes;

generating a second matrix for a fixed time period of the plurality of fixed time periods based on an aggregation of the time attributes and the program attributes for each first matrix element of the first matrix for each network; and modify a forecast of the expected viewership based on the plurality of first matrices and the second matrix, and wherein the forecast of the expected viewership is associated with the one or more second spots and each of the one or more orders in the one or more deals;

reshuffle placement of a remaining portion of the one or more first spots concurrently with the placement of the portion of the one or more first spots, so as to minimize liability associated with the one or more deals, wherein the reshuffle is based on the liability per pending spot of the one or more second spots that are determined to be the candidates for the advertisement scheduling and based on the modified forecast of the expected viewership; and generate a finalized commercial break schedule based on the reshuffle.

11. The advertisement management system according to claim 10, wherein the one or more hardware processors are further configured to determine a percentage lift to provide the baseline target delivery.

12. The advertisement management system according to claim 10, wherein the baseline target delivery is a mean target delivery per selling title.

13. The advertisement management system according to claim 12, wherein the mean target delivery per selling title is determined from a sum of all deliveries in a 30-minute period within the selling title divided by a number of 30-minute periods.

14. The advertisement management system according to claim 10, wherein the baseline target delivery is a median target delivery per selling title.

15. The advertisement management system according to claim 11, wherein the percentage lift is adjustable based on accrued actual target delivery.

16. The advertisement management system according to claim 15, wherein the one or more hardware processors are further configured to adjust the lift goal based on the accrued actual target delivery that is less than a forecasted target delivery.

17. The advertisement management system according to claim 10, wherein the one or more hardware processors are further configured to:

determine a second target for each of one or more targeting deals; and generate, for the second target, an estimate of the expected viewership associated with the one or more targeting deals.

18. The advertisement management system according to claim 10, wherein the one or more hardware processors are further configured to:

determine a second demographic for each of the one or more orders in the one or more deals; and generate, for the second demographic, an estimate of the expected viewership associated with each of the one or more orders in the one or more deals.

19. A non-transitory computer-readable medium having stored thereon computer-executable instructions that, when executed by one or more hardware processors of an advertisement management system, cause the one or more hardware processors to execute operations, the operations comprising:

electronically receiving one or more deals from a plurality of advertiser order generation systems, via a communication network, wherein the one or more deals comprise one or more orders from advertisers;

receiving a commercial break schedule generated from a completed assignment of one or more first spots, wherein the one or more first spots correspond to the one or more deals comprising the one or more orders;

determining which of the one or more orders in the one or more deals are targeting orders;

calculating a baseline target delivery for the targeting orders based on expected viewership associated with the targeting orders;

placing a portion of the one or more first spots for the targeting orders based on a lift goal over the baseline target delivery;

determining a liability per pending spot for one or more second spots that are determined to be candidates for advertisement scheduling;

determining a plurality of first matrices for a plurality of networks and for a plurality of fixed time periods, wherein each first matrix element of a first matrix of the plurality of first matrices for each network of the plurality of networks includes time attributes and program attributes;

generating a second matrix for a fixed time period of the plurality of fixed time periods based on an aggregation of the time attributes and the program attributes for each first matrix element of the first matrix for each network;

modifying a forecast of the expected viewership based on the plurality of first matrices and the second matrix, and wherein the forecast of the expected viewership is associated with the one or more second spots and each of the one or more orders in the one or more deals;

reshuffling placement of a remaining portion of the one or more first spots concurrently with the placement of the portion of the one or more first spots, so as to minimize liability associated with the one or more deals, wherein the reshuffling is based on the liability per pending spot of the one or more second spots that are determined to be the candidates for the advertisement scheduling and based on the modified forecast of the expected viewership; and generating a finalized commercial break schedule based on the reshuffling.

20. The non-transitory computer-readable medium according to claim 19, wherein the mean target delivery per selling title is determined from a sum of all deliveries in a 30-minute period within the selling title divided by a number of 30-minute periods.

21. The non-transitory computer-readable medium according to claim 19, wherein the baseline target delivery is a mean target delivery per selling title.

22. The non-transitory computer-readable medium according to claim 21, wherein the mean target delivery per selling title is determined from a sum of all deliveries in a 30-minute period within the selling title divided by a number of 30-minute periods.

23. The non-transitory computer-readable medium according to claim 19, wherein the baseline target delivery is a median target delivery per selling title.

24. The non-transitory computer-readable medium according to claim 20, wherein the percentage lift is adjustable based on accrued actual target delivery.

25. The non-transitory computer-readable medium according to claim 24, further comprising adjusting the lift goal based on the accrued actual target delivery that is less than a forecasted target delivery.

26. The non-transitory computer-readable medium according to claim 19, further comprising:
 determining a target for each of one or more targeting deals; and
 generating, for the target, an estimate of the expected viewership associated with the one or more targeting deals.

27. The non-transitory computer-readable medium according to claim 19, further comprising:
 determining a demographic for each of the one or more orders in the one or more deals; and
 generating, for the demographic, an estimate of the expected viewership associated with each of the one or more orders in the one or more deals.

* * * * *